(12) United States Patent
Kumkar et al.

(10) Patent No.: US 10,620,444 B2
(45) Date of Patent: Apr. 14, 2020

(54) DIFFRACTIVE OPTICAL BEAM SHAPING ELEMENT

(71) Applicant: TRUMPF Laser- und Systemtechnik GmbH, Ditzingen (DE)

(72) Inventors: Malte Kumkar, Ditzingen (DE); Daniel Grossmann, Ditzingen (DE); Daniel Flamm, Ditzingen (DE)

(73) Assignee: TRUMPF Laser- und Systemtechnik GmbH, Ditzingen (*) Notice: Subject to any disclaimer, the term of this patent is extended or adjusted under 35 U.S.C. 154(b) by 125 days.

(21) Appl. No.: 15/599,623

(22) Filed: May 19, 2017

(65) Prior Publication Data
US 2017/0276951 A1  Sep. 28, 2017

Related U.S. Application Data

(63) Continuation of application No. PCT/EP2015/076708, filed on Nov. 16, 2015.

(30) Foreign Application Priority Data

Nov. 19, 2014 (DE) .......................... 10 2014 116 958

(51) Int. Cl.
*G02B 27/09* (2006.01)
*G02B 27/42* (2006.01)
(Continued)

(52) U.S. Cl.
CPC ........ *G02B 27/0944* (2013.01); *B23K 26/064* (2015.10); *B23K 26/066* (2015.10);
(Continued)

(58) Field of Classification Search
CPC .............. G02B 27/0944; G02B 27/425; B23K 26/0622; B23K 26/0624; B23K 26/064; B23K 26/066
(Continued)

(56) References Cited

U.S. PATENT DOCUMENTS 5,328,785 A   7/1994 Smith et al.
5,656,186 A   8/1997 Mourou et al.
(Continued)

FOREIGN PATENT DOCUMENTS

CN   102656421    9/2012
DE   100 62 453 A1   7/2002
(Continued)

OTHER PUBLICATIONS

Hiroaki JP 2005288503 translation.*
(Continued)

*Primary Examiner* — Kristina M Deherrera
(74) *Attorney, Agent, or Firm* — Fish & Richardson P.C.

(57) ABSTRACT

A diffractive optical beam shaping element for imposing a phase distribution on a laser beam that is intended for laser processing of a material includes a phase mask that is shaped as an area and is configured for imposing a plurality of beam shaping phase distributions on the laser beam incident on to the phase mask. A virtual optical image is attributed to at least one of the plurality of beam shaping phase distributions, wherein the virtual image can be imaged into an elongated focus zone for creating a modification in the material to be processed. Multiple such elongated focus zones can spatially add up and interfere with each other, to modify an intensity distribution in the material and, for example, generate an asymmetric modification zone.

26 Claims, 22 Drawing Sheets

(51) Int. Cl.
  *B23K 26/0622* (2014.01)
  *B23K 26/064* (2014.01)
  *B23K 26/066* (2014.01)

(52) U.S. Cl.
  CPC ...... *B23K 26/0622* (2015.10); *B23K 26/0624* (2015.10); *G02B 27/425* (2013.01)

(58) Field of Classification Search
  USPC .................................................. 359/558–576
  See application file for complete search history.

(56) References Cited

U.S. PATENT DOCUMENTS

| | | | |
|---|---|---|---|
| 6,185,168 | B1 | 2/2001 | Kato et al. |
| 6,285,001 | B1 | 9/2001 | Fleming et al. |
| 6,552,301 | B2 | 4/2003 | Herman et al. |
| 7,482,776 | B2 | 1/2009 | Scholich-Tessmann |
| 7,566,635 | B2 | 7/2009 | Fujii et al. |
| 8,268,704 | B2 | 9/2012 | Fujii et al. |
| 8,304,325 | B2 | 11/2012 | Fujii et al. |
| 8,314,013 | B2 | 11/2012 | Fujii et al. |
| 8,518,800 | B2 | 8/2013 | Fujii et al. |
| 8,518,801 | B2 | 8/2013 | Fujii et al. |
| 8,519,511 | B2 | 8/2013 | Fujii et al. |
| 8,946,586 | B2 | 2/2015 | Bea et al. |
| 10,310,287 | B2 | 6/2019 | Ellenbogen et al. |
| 2002/0040892 | A1 | 4/2002 | Koyama et al. |
| 2003/0052102 | A1 | 3/2003 | Amako et al. |
| 2003/0102291 | A1 | 6/2003 | Liu et al. |
| 2004/0240063 | A1* | 12/2004 | Delage ............... G02B 6/12007 359/571 |
| 2010/0065537 | A1 | 3/2010 | Watatani et al. |
| 2010/0176102 | A1 | 7/2010 | Petring et al. |
| 2010/0206857 | A1 | 8/2010 | Bea et al. |
| 2010/0288740 | A1 | 11/2010 | Komiya et al. |
| 2012/0329247 | A1 | 12/2012 | Sakamoto |
| 2014/0199519 | A1 | 7/2014 | Schillinger et al. |
| 2015/0158120 | A1 | 6/2015 | Courvoisier et al. |
| 2015/0166393 | A1 | 6/2015 | Marjanovic et al. |
| 2016/0031745 | A1 | 2/2016 | Ortner et al. |
| 2016/0052082 | A1 | 2/2016 | Schulz et al. |
| 2016/0129526 | A1 | 5/2016 | Russ et al. |
| 2016/0152508 | A1 | 6/2016 | Kumkar |
| 2016/0259175 | A1 | 9/2016 | Ellenbogen et al. |
| 2017/0192246 | A9 | 7/2017 | Popovich et al. |
| 2017/0252859 | A1 | 9/2017 | Kumkar et al. |
| 2017/0276951 | A1 | 9/2017 | Kumkar et al. |

FOREIGN PATENT DOCUMENTS

| | | |
|---|---|---|
| DE | 600 11 634 T2 | 6/2005 |
| DE | 10 2007 024 700 | 12/2008 |
| DE | 102012110971 A1 | 5/2014 |
| DE | 10 2014 116 957 | 5/2016 |
| DE | 10 2014 116 958 | 5/2016 |
| EP | 0735527 | 10/1996 |
| EP | 1 212 166 B1 | 3/2001 |
| EP | 1 386 689 A1 | 11/2002 |
| EP | 2 202 545 A1 | 6/2010 |
| EP | 2 754 524 A1 | 7/2014 |
| FR | 2 823 688 A1 | 10/2002 |
| FR | 2 977 513 A1 | 1/2013 |
| JP | 2005-288503 A | 10/2005 |
| JP | 2008-137029 A | 6/2008 |
| KR | 2011-0106360 | 9/2011 |
| WO | WO 95/30932 | 11/1995 |
| WO | WO 01/21353 | 3/2001 |
| WO | WO 2009/040103 | 4/2009 |
| WO | WO 2010/071128 | 6/2010 |
| WO | WO 2012/006736 | 1/2012 |
| WO | WO 2012/041711 | 4/2012 |
| WO | WO 2013/006736 | 1/2013 |
| WO | WO 2013/138802 | 9/2013 |
| WO | WO 2014/111794 | 7/2014 |
| WO | WO 2014/154337 | 10/2014 |
| WO | WO 2014/154342 | 10/2014 |
| WO | WO 2014/154345 | 10/2014 |
| WO | WO 2015/075059 | 5/2015 |
| WO | WO2016005455 A1 | 1/2016 |
| WO | WO 2016/079062 | 5/2016 |
| WO | WO 2016/079063 | 5/2016 |
| WO | WO 2016/079275 | 5/2016 |

OTHER PUBLICATIONS

German National Office Action in Application No. DE 10 2014 116 957.3, dated Jul. 15, 2015, 4 pages (English translation).
German National Office Action in Application No. DE 10 2014 116 958.1, dated Jul. 15, 2015, 3 pages (English translation).
International Search Report PCT/EP2015/076707 dated Feb. 19, 2016.
Examination Report DE 10 2014 116 958.1 (priority application to PCT/EP2015/076708 dated Jul. 15, 2015.
International Search Report PCT/EP2015/076708 dated Feb. 8, 2016.
International Search Report PCT/EP2015/077172 dated Mar. 9, 2016.
Examination Report DE 10 2014 116 957.3 (priority application to PCT/EP2015/076707) dated Jul. 15, 2015.
Chremmos et al., "Bessel-like optical beams with arbitrary trajectories", Dec. 1, 2012, vol. 37, No. 23, Optics Letters.
Čižmár et al., "Tunable Bessel light modes: engineering the ax-ial propagation", Aug. 31, 2009, vol. 17, No. 18, Optics Express 15558.
Du et al., "Generation of three-dimensional optical bottle beams via focused non-diffracting Bessel beam using an axicon", Optics Communications 317 (2014) 24-28.
Duocastella et al., "Bessel and annular beams for materials processing", Laser Photonics Rev. 6, No. 5, 607-621 (2012)/DOI 10.1002/1por.201100031.
Grewel et al., "Diffractive optics as beam-shaping elements for plastics laser welding", Optical Engineering 46(11), 118001 (Nov. 2007).
Leach et al., "Generation of achromatic Bessel beams using a compensated spatial light modulator", Jun. 12, 2006, vol. 14, No. 12, Optics Express 5581.
Siviloglou et al., "Observation of Accelerating Airy Beams", PRL 99, 213901 (2007).
Valle et al., "Analytic design of multiple-axis, multifocal diffractive lenses", Mar. 15, 2012, vol. 37, No. 6, Optics Letters.
Zhu et al., "Three-dimensional shape-controllable focal spot array created by focusing vortex beams modulated by multi-value pure-phase grating", Sep. 8, 2014, vol. 22, No. 18, DOI:10.1364/OE.22.021354, Optics Express 21354.
Office Action in Korean Application No. 10-2017-7016685, dated Jan. 31, 2019, 10 pages (with English translation).
Office Action in Chinese Application No. 201580063156.7, dated Jan. 18, 2019, 10 pages (with English translation).
KR Office Action in Korean Appln. No. 10-2017-7016685, dated Sep. 30, 2019, 7 pages (with English translation).
CN Office Action in Chinese Appln. No. 201580063156.7, dated Oct. 9, 2019, 16 pages (with English translation).

* cited by examiner

DIFFRACTIVE OPTICAL BEAM SHAPING ELEMENT

CROSS-REFERENCE TO RELATED APPLICATIONS

This application is a continuation of and claims priority under 35 U.S.C. § 120 to PCT Application No. PCT/EP2015/076708 filed on Nov. 16, 2015, which claims priority to German Application No. 10 2014 116 958.1, filed on Nov. 19, 2014. The entire contents of these priority applications are incorporated herein by reference.

TECHNICAL FIELD

The present invention relates to diffractive optical elements that are used in optical systems for beam shaping a laser beam and in particular for beam shaping a laser beam for processing materials that are essentially transparent for the laser beam. Moreover, the invention relates to a method for laser material processing.

BACKGROUND

There are many possibilities for using absorption of light for processing a work-piece, in particular by introducing localized modifications into the work-piece. The so-called volume absorption, i.e., an absorption that is not limited to the surface, opens the possibility to process brittle-hard materials that are essentially transparent for the laser beam. Generally, volume absorption benefits from a kind of non-linear absorption, at which an interaction with the material takes place only at a material dependent (threshold) intensity.

SUMMARY

Herein, a nonlinear absorption is understood as an intensity dependent absorption of light, that is not primarily based on the direct absorption of the light. Instead it is based on an increase of the absorption during interaction with the incident light, often a temporally limited laser pulse. Thereby, electrons can absorb that much energy by inverse bremsstrahlung that further electrons are set free by impacts, so that the rate of generating electrons overcomes that rate of recombination. Under specific conditions, those initial electrons, which are required for the avalanche-like absorption, may already be present from the start or may be generated by an existing rest-absorption by linear absorption. For example, for ns-laser pulses, an initial ionization may result in an increase in temperature that causes an increase of the number of free electrons and therefore of the following absorption. Under other conditions, such initial electrons may be generated by multi-photon ionization or tunnel ionization as examples of well-known nonlinear absorption mechanisms. For ultrashort laser pulses with, for example, sub-ns-pulse durations such an avalanche-like generation of electrons can be utilized.

A volume absorption may be used for materials, which are essentially transparent for the laser beam (herein in short referred to as transparent materials), for forming a modification of the material in an elongated focus zone. Such modifications may allow separating, drilling, or structuring of the material. For separating, for example, rows of modifications may be generated that cause a breaking within or along the modifications. Moreover, it is known to generate modifications for separating, drilling, and structuring that allow a selective etching of the modified areas (SLE: selective laser etching).

The generation of an elongated focus zone can be affected with the help of apodized Bessel beams (herein also referred to as quasi-Bessel beam). Such beam profiles may be formed, for example, with an axicon or a spatial light modulator (SLM: spatial light modulator) and an incident light beam having a Gaussian beam profile. A subsequent imaging into a transparent work-piece results in the intensities required for volume absorption. Quasi-Bessel beams—like Bessel beams—usually have a ring-shaped intensity distribution in the far field of the beam profile existing within the work-piece. Calculating phase distributions for beam shaping quasi-Bessel beams, e.g., with an SLM is disclosed in Leach et al., "Generation of achromatic Bessel beams using a compensated spatial light modulator," Opt. Express 14, 5581-5587 (2006), the entire contents of which are incorporated by reference.

Moreover, systems are known for forming a line of intensity enhancements, e.g., with the help of multifocal lenses. Thereby, a phase modification of the laser beam to be focused is performed in the far field, i.e., during focusing, whereby the phase modification results in the formation of longitudinally displaced focus zones.

An aspect of the present disclosure has the objective to provide a diffractive optical beam shaping element that enables beam shaping for a tailored volume absorption. In particular, the objective is, for laser processing applications, to provide in beam propagation direction elongated, slender beam profiles with a high aspect ratio for processing transparent materials.

At least one of the objectives is solved by a diffractive optical beam shaping element of claim 1, an optical system of claim 10, a laser processing machine of claim 12, and a method for material processing a laser beam of claim 22. Further developments are given in the dependent claims.

In an aspect, a diffractive optical beam shaping element for imposing a phase distribution on a laser beam, which is intended for laser processing of a material, includes an areally configured phase mask that is configured for imposing a plurality of beam shaping phase distributions on the laser beam that is incident on to the phase mask. A virtual optical image is attributed to at least one of the plurality of beam shaping phase distributions, wherein the virtual image can be imaged into an elongated focus zone for creating a modification in the material to be processed.

In another aspect, an optical system for beam shaping of a laser beam for processing an in particular transparent material by modifying the material in a common focus zone being elongated in propagation direction includes such a diffractive optical beam shaping element and a near field optics located downstream of the diffractive optical beam shaping element at a beam shaping distance and configured to focus the laser beam into the focus zone. Thereby, at least one imposed phase distribution of the plurality of beam shaping phase distributions is such that a virtual optical image of an elongated focus zone is attributed to the laser beam, the optical image being located before the diffractive optical beam shaping element. The beam shaping distance corresponds to a propagation length of the laser beam within which the plurality of beam shaping phase distributions transform the transverse input intensity profile into a transverse output intensity profile in the region of the near field optics. In particular, the transverse output intensity profile has, in comparison with the input intensity profile, at least one local maximum positioned outside of the beam axis.

In a further aspect, a method for material processing a material, which is in particular to a large extent transparent for the laser beam, by modifying the material with a laser beam includes the following steps: imposing a plurality of beam shaping phase distributions onto a transverse input intensity profile of the laser beam, wherein at least one of the imposed phase distributions is such that a virtual optical image of an elongated focus zone is attributed to the laser beam; propagating the laser beam over a beam shaping distance, after which the plurality of imposed beam shaping phase distributions has transferred the transverse input intensity profile into a transverse output intensity profile, so that the transverse output intensity profile, in comparison to the input intensity profile, includes in particular at least one local maximum located outside of the beam axis; focusing the laser beam into the focus zone for forming a near field, which is based on the output intensity profile, while superposing, adding, and/or interfering the elongated focus zone attributed to the virtual optical image with at least one further focus zone, which is based on at least one further phase distribution of the plurality of beam shaping phase distributions.

Herein, concepts are disclosed that allow to at least partly improve aspects of the prior art. In particular, additional features and their functionalisms result from the following description of embodiments on the basis of the drawings. The drawings show:

DETAILED DESCRIPTION

Figure 1:
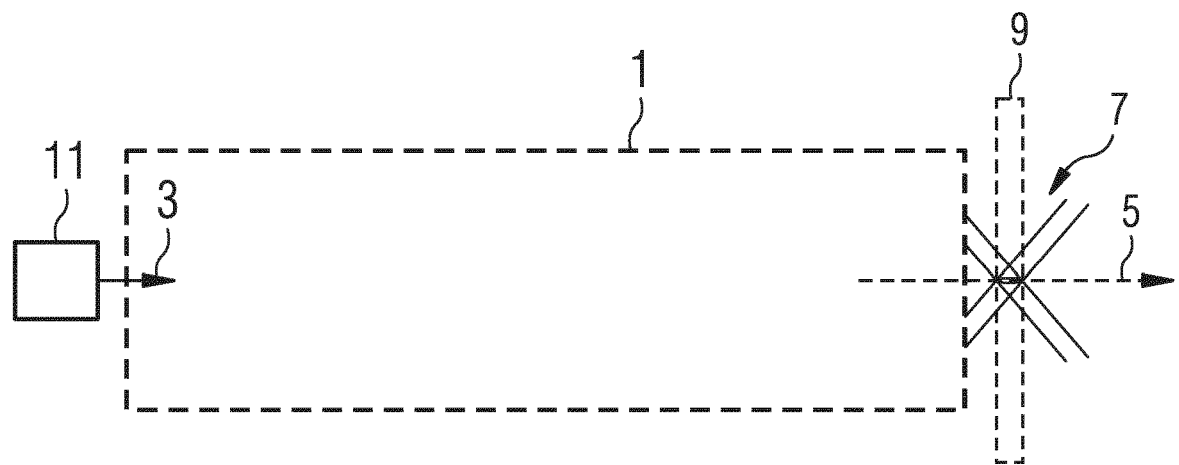
FIG. 1 is a schematic illustration of an optical system for beam shaping of a laser beam.

Aspects described herein are based partly on the realization that, due to the high intensities needed for laser processing, intensities may be present already during the preparation of the laser beam that result in damage of optical elements. In view thereof, it was further realized that the generation of an elongated focus zone within the work-piece may be based on the imaging of a virtual beam profile. By this concept of imaging a virtual beam profile, regions with intensity peaks can be reduced or even avoided in the optical system. It was further realized that a phase distribution attributed to the virtual beam profile may be imposed onto the laser beam that causes the desired change of the intensity distribution in the far field. In particular, it was realized that by a far field distribution, which originates from such a virtual beam profile, for example, inverse-Bessel beam-like or inverse quasi-Airy beam-like intensity distributions, specifically designed intensity distributions, and in particular superpositions of the same in the focus zone can be created. For such intensity distributions, a lateral energy entry into the focus zone can take place, which in particular enables the processing of transparent materials. It was further realized that, in comparison to systems for imaging a real intensity enhancement, the concept of the imaging of a virtual beam profile may lead to shorter configurations of such optical systems.

An elongated focus zone relates herein to a three-dimensional intensity distribution defined by the optical system that determines the spatial extent of the interaction and thereby the modification within the to be processed material. The elongated focus zone determines thereby an elongated region in which a fluence/intensity is present within the to be processed material, which is beyond the threshold fluence/intensity being relevant for the processing/modification. Usually, one refers to elongated focus zones if the three-dimensional intensity distribution with respect to a target threshold intensity is characterized by an aspect ratio (extent in propagation direction in relation to the lateral extent) of at least 10:1, for example 20:1 and more, or 30:1 and more. Such an elongated focus zone can result in a modification of the material with a similar aspect ratio. In some embodiments, focus zones can be formed that are, for example, also in propagation direction parallel with respect to each other, wherein each of the focus zones has a respective aspect ratio. In general, for such aspect ratios, a maximal change of the lateral extent of the (effective) intensity distribution over the focus zone can be in the range of 50% and less, for example 20% and less, for example in the range of 10% and less.

Thereby, the energy within an elongated focus zone can be laterally supplied essentially over the complete length of the created modification. As a consequence, a modification of the material in the initial region of the modification does not have or hardly has any shielding effects on the part of the laser beam that causes a modification of the material downstream of the beam, i.e., for example, in the end region of the modification zone. In that sense, a Gaussian beam cannot generate a comparable elongated focus, because the energy supply is performed essentially longitudinally and not laterally.

The transparency of a material, which is essentially transparent for a laser beam, relates herein to the linear absorption. For light below the threshold fluence/intensity, material, which is essentially transparent for a laser beam, may absorb, for example, along a length up to the back end of the modification, e.g., less than 20% or even less than 10% of the incident light.

Aspects described herein further are partly based on the realization that by a desired beam shaping, for example, with a diffractive optical element (DOE), the density of free electrons, which is created in the material by nonlinear absorption, may be tailored. Along the thereby created modifications, a crack formation may be specifically guided, which then results in the separation of the work-piece.

Aspects described herein further are based partly on the realization that, for a DOE, multiple phase distributions can be provided in the phase distribution of a phase mask, for example, in respective segments. Thereby, in particular the advantages of the concept of a virtual optical image, for example, an inverse quasi-Bessel beam (e.g., inverse quasi-Bessel like beam) shape, can be used at the superposition of the imaging of multiple such virtual images (in longitudinal or lateral direction), wherein also the interaction (e.g., interference) and spatial constellation of multiple imaging may have effects onto the formation of the common focus zone. In addition, it was recognized that in this manner asymmetric "common" focus zones can be created. For example, for material processing, asymmetric "common" focus zones create a preference for a specific movement direction or a specific separation direction. Moreover, it was recognized that, during the laser processing, such preferred directions may be adopted to desired processing trajectories by orienting/turning the DOE within an optical system. For digital phase masks (SLMs etc.), a direct controlling of the phase distribution may further be performed to adapt the preferred direction.

Aspects described herein further are based in part on the realization that, by the use of a DOE, additional phase distributions may be imposed onto the beam, which, for example, may simplify the setup of the underlying optical systems and/or the isolation of a usable beam portion.

In other words, disadvantages of the prior art may in some embodiments at least partly be overcome by an optic concept, in which the beam profile, which is positioned in the region of the work-piece and which is elongated in propagation direction, is affected by an imaging of a created virtual beam profile. In some embodiments, the optic concept further allows a filtering possibility for undesired beam portions, for example, in a region of the Fourier-plane of the beam profile and a separation of the beam shaping from the focusing.

The systems and methods resulting from these realizations can inter alia enable separating of transparent, brittle-hard materials with high velocity and with good quality of the cutting edge. Moreover, such systems and methods may further enable separating without a taper angle as it is created in ablating methods. In particular, when separating based on non-ablating modifications, there may be no or only a small removal, with the consequence that the material has only a few particles on the surface after the processing.

In the following, the underlying optical concept will be generally explained with reference to FIGS. 1 to 8. Then, exemplary embodiments of optical systems will be explained, which, on the one side, implement the optical system by conventional optics such as lenses and mirrors (see FIGS. 9 to 11B) and, on the other side, by diffractive optical elements (see FIGS. 12 to 16). In connection with FIGS. 17 to 22, the combinability of the optical system with components and aspects for filtering and scanning as well as general aspects of the beam development within the optical system are explained. Finally, in connection with FIGS. 23 to 32, exemplary embodiments of the elongated focus zones for material processing are illustrated, which in particular can be realized with diffractive optical elements. In FIGS. 33A to 33D and 34, beam profiles and a longitudinal amplitude distribution are explained for an inverse quasi-Bessel beam at the propagation from the beam shaping element to the near field optics in the optical system.

In the remaining figures, various concepts are proposed that relate to the interference of inverse quasi-Bessel beams in e.g., longitudinal displaced focus zones (FIGS. 35A to 41) and to the formation of transverse asymmetries due to azimuthal segmentation (FIGS. 42 to 46) and transverse displaced phase distributions (FIGS. 47 to 52C).

FIG. 1 shows a schematic illustration of an optical system 1 for beam shaping a laser beam 3 with the aim to create a focus zone 7, which is elongated in a propagation direction 5, within a to be processed material 9. Generally, laser beam 3 is determined by beam parameters such as wavelength, spectral width, temporal pulse shape, formation of pulse groups, beam diameter, transverse input intensity profile, transverse input phase profile, input divergence, and/or polarization. According to FIG. 1, laser beam 3 is supplied to optical system 1 for beam shaping, i.e., for transforming one or more of the beam parameters. Usually, for laser material processing, laser beam 3 will be a collimated Gaussian beam with a transverse Gaussian intensity profile, which is generated by a laser beam source 11, for example an ultrashort pulse high-intensity laser system. The transformation can be performed, for example, into an inverse Bessel or inverse Airy beam shape.

Figure 2:
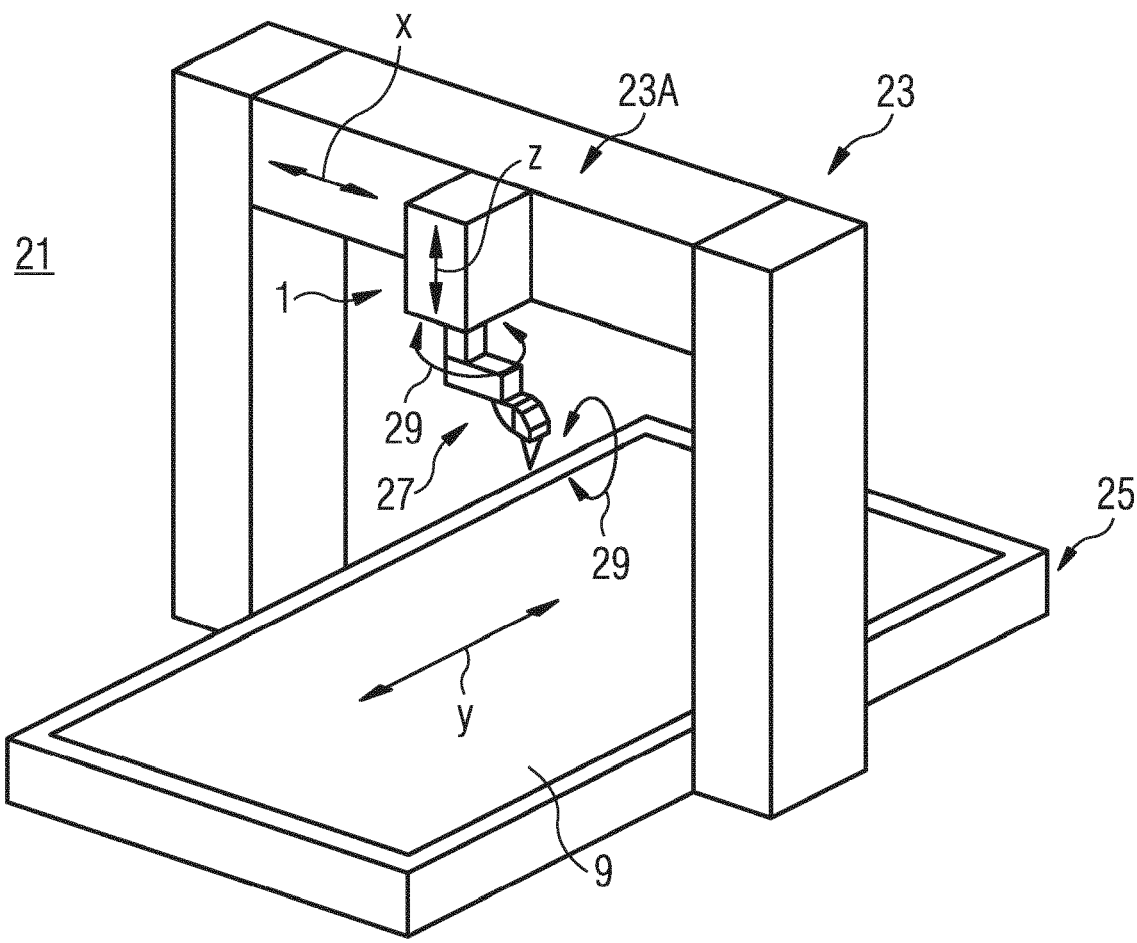
FIG. 2 is a schematic illustration of a laser processing device with an optical system according to FIG. 1 for material processing.

In the laser processing machine 21 shown in FIG. 2, optical system 1 may, for example, be used for material processing. Laser processing machine 21 includes a support system 23 and a work-piece positioning unit 25. Support system 23 spans over work-piece positioning unity 25 and carries laser system 11, which is integrated in FIG. 2, for example, in an upper crossbeam 23A of support system 23. In addition, optical system 1 is mounted at crossbeam 23A to be displaceable in X direction, so that both components are arranged close to each other. In alternative embodiments, laser system 11 may be provided, for example, as a separate external unit, laser beam 3 of which is guided to optical system 1 by optical fibers or as a free propagating beam.

Work-piece positioning unit 25 carries a work-piece that extends in the X-Y-plane. The work-piece is the to be processed material 9, for example, a glass plate or a plate in ceramic or crystalline embodiment such as sapphire or silicon, that is essentially transparent for the laser wavelength used. Work-piece positioning unit 25 allows displacing the work-piece in Y direction relative to support system 23, so that, in combination with the displaceability of optical system 1, a processing area is provided, which extends within the X-Y-plane.

According to FIG. 2, in addition, a relocatability is provided of e.g., optical system 1 or crossbeam 23A in Z direction, such that the distance to the work-piece can be set. For a cut running in Z direction, the laser beam is usually also directed in the Z direction (i.e., normal) onto the work-piece. However, additional processing axes may be provided as exemplarily illustrated in FIG. 2 by the boom arrangement 27 and the additional rotational axes 29. Accordingly, boom arrangement 27 is optional in the embodiment of FIG. 2. In addition, redundant add-on axes may be provided for higher dynamics, as, for example, not the work-piece or the optical system, but more compact and respectively designed components are accelerated.

Laser processing machine 21 further includes a control unit not explicitly shown in FIG. 1, which is, for example, integrated within support system 23 and which in particular includes an interface for inputting operation parameters by a user. In general, the control unit includes elements for controlling electrical, mechanical, or optical components of laser processing machine 21, for example, by controlling respective operation parameters such as pump laser power, cooling power, direction and velocity of the laser machine and/or the work-piece positioning unit, electrical parameters for setting an optical element (for example, of an SLM) and the spatial orientation of an optical element (for example, for rotation of the same).

Additional arrangements for laser processing machines with various degrees of freedom are disclosed, for example, in EP 1 688 807 A1, the entire contents of which are incorporated by reference. In general, for smaller work-pieces often only the work-piece is moved, and for larger work-pieces only the laser beam or—as in FIG. 2—the work-piece and the laser beam are moved. Moreover, two or more optical systems and, thus, focus zones may be supplied by a single laser system 11.

The modifications within the material, which are generated by the laser processing machine, may be used, for example, for drilling, separating by induced tensions, welding, creating a modification of the refraction behavior, or for selective laser etching. Accordingly, it is important to control the geometry as well as the type of modification in a suitable manner. Besides parameters such as laser wavelength, temporal pulse shape, number of pulses, energy and temporal distance of the pulses within a pulse group creating an individual modification, as well as pulse energy or pulse group energy, the beam shape plays a decisive role.

In particular, an elongated volume modification allows processing of a, in beam propagation direction long extending, volume region within a single processing step. In particular, at one position in feed direction, the processing can take place over a large extent in only a single modification processing step. By the use of the optical systems described herein, beam shapes, and methods, one can achieve, on the one side, better work results (in comparison to single modifications that are positioned next to each other at one position in feed direction in succeeding modification processing steps) and, on the other side, one can reduce the processing time and the requirements for the system technology. Then, for single modifications, multiple working steps are needed that increase the time needed and that require a more involved ensuring of relative positions of the single modifications.

In addition, an elongated focus zone can be helpful when processing uneven materials, because essentially identical laser processing conditions are given along the elongated focus zone such that, in those embodiments, a respective readjusting in propagation direction may not be necessary or only be necessary starting at a larger deviation of the position of the to be processed material than the lengths of the elongated focus area (in consideration of the required processing/intrusion depth).

In general, it applies to the processing of transparent materials by elongated volume absorption that, as soon as absorption takes place, that absorption itself or the resulting changes in the material properties can influence the propagation of the laser beam. Therefore, it is advantageous, if beam portions, which should cause a modification deeper within the work-piece, i.e., in beam propagation direction downward, essentially propagate not through regions of considerable absorption.

In other words, it is favorable to lead those beam portions, which contribute to the modification further downward, under an angle to the interaction zone. An example for this is the quasi-Bessel beam, for which a ring-shaped far-field distribution is given, the ring width of which is typically small in comparison to the radius. Thereby, the beam portions of the interaction zone are led in essentially with that angle in rotational symmetry. The same applies for the inverse quasi-Bessel beam described herein or for modifications or extensions of the same such as the homogenized or modulated inverse quasi-Bessel beam. Another example is the inverse accelerated "quasi-Airy beam-like" beam, for which the beam portions are led into the modification under an offset angle, where this is done clearly tangential and—not as for the pure quasi-Bessel beam rotationally symmetric—to the curved modification zone, e.g., as for a curved inverse quasi-Bessel beam.

Moreover, it is desired to considerably pass the threshold for the nonlinear absorption only within the desired volume region and to choose the geometry of that volume area such that it is suitable for the desired application, but that also the propagation to further downstream positioned volume regions is not significantly disturbed. For example, it may be advantageous to keep secondary maxima of an apodized Bessel beam profile below a threshold intensity needed for nonlinear absorption.

In view of modifications being subsequent in the feed direction, the geometry of the modified volume may further be selected such that, for a row of multiple modifications in the feed direction, an earlier induced modification has only an insignificant influence on the formation of the following modifications.

As already mentioned, for fast processing, the generation of a single modification can be performed with only a single laser pulse/a single laser pulse group, so that a position on a work-piece is approached only once in this case.

Ultrashort pulse lasers can make intensities (power densities) available that allow causing a sufficiently strong material modification in respective long interaction zones. The geometric extent of the modification is thereby set with the help of beam shaping such that a long extending, high density of free electrons is created by nonlinear absorption in the material. The supply of energy in deeper regions is performed laterally, so that the shielding effect by an upstream interaction of the plasma can be avoided in comparison to a Gaussian focusing. For example, an electron density, which extends smoothly in longitudinal direction, or an electron density, which is modulated spatially with a high frequency, can be generated.

At the respective intensities, within regions with a sufficiently high density of free electrons, an explosive expansion of the material may be caused, whereby the thereby resulting shock-wave can create nanoscopic holes (nano-voids). Additional examples for modifications (modification zones) are changes in the refractive index, compressed and/or tensile stress induced regions, micro-crystallites, and local changes in stoichiometry.

As explained at the beginning, by the accumulation of such modification zones in feed direction, a course of a crack can be set. During processing, the work-piece is accordingly separated along a respective modified contour. The crack formation can then occur directly thereafter or can be induced by another process. For example, for the separation of non-pre-strained materials ultrasound ramps, or temperature ramps may be used in order to cause a later separation along the modified contour. A single modification usually does not lead to crack formation.

With the help of a tailored beam shape, various tension distributions within the material and between the modified regions can be created in order to adapt the separation process to a given material. In the process, strong spatial and temporal gradients can favor the formation of a micro- or nano-explosion.

The modification geometry is thereby primarily determined by the beam shaping (and not by the nonlinear propagation as, for example, the filamentation). The generation of spatial gradients can be achieved by the optical systems described herein, while the generation of the temporal gradients can be achieved by pulse trains or pulse shaping.

Generally, a scaling of the intensity distribution of a beam shape can be achieved by the imaging ratio of the system, in particular by the focal length and the numerical aperture of the near field optics of the imaging system. Additional possibilities for scaling result from the use of an additional lens as well as the shifting of the beam shaping element and/or the far field optics (see the description in connection with FIGS. 17 and 22). Thus, the lateral and longitudinal extent of the beam profile within the work-piece can be influenced. In addition, spatial filters and apertures may be used within the beam path for beam shaping, in order to prepare the beam.

Exemplary laser beam parameters for, for example, ultrashort pulse laser systems and parameters of the optical system and the elongated focal zone, which can be applied within the range of this disclosure, are:

pulse energy Ep: 1 µJ to 10 mJ (e.g., 20 µJ to 1000 µJ), energy of a pulse group Eg: 1 µJ to 10 mJ ranges of wavelength: IR, VIS, UV (e.g., 2 µm>λ>200 nm; e.g., 1550 nm, 1064 nm, 1030 nm, 515 nm, 343 nm)

pulse duration (FWHM): 10 fs to 50 ns (e.g., 200 fs to 20 ns)

interaction duration (depending on the feed velocity): smaller 100 ns (e.g., 5 ps-15 ns)

duty cycle (interaction duration to repetition time of the laser pulse/the pulse group): less than or equal to 5%, e.g., less than or equal to 1% raw beam diameter D (1/e2) when entering the optical system: e.g., in the range from 1 mm to 25 mm focal lengths of the near field optics: 3 mm to 100 mm (e.g., 10 mm to 20 mm)

numerical aperture NA of the near field optics: $0.15 \leq NA \leq 0.5$ length of beam profile within the material: larger 20 µm maximal lateral extent of the beam profile within the material, where applicable in the short direction: smaller 20λ aspect ratio: larger 20 modulation in propagation direction: larger 10 periods over the focus zone feed dv between two neighboring modifications e.g., for separating applications:

100 nm<dv<10*lateral extent in feed direction feed during interaction duration: e.g., smaller 5% of the lateral extent in feed direction Thus, the pulse duration of the laser pulse and the interaction duration relate to a temporal range, within which, for example, a group of laser pulses interacts with the material for the formation of a single modification at a location. Thereby, the interaction duration is short regarding the present feed velocity, so that all laser pulses of a group contribute to a modification at one position.

If the work-piece is thinner than the focus zone is long, the focus zone is positioned partially outside of the work-piece, so that modifications may be caused that are shorter than the focus zone. Such a situation may be advantageously used to make the processing process robust also with respect to varying the distance between the optics and the work-piece. In some embodiments, a modification may be advantageous that does not reach through the complete work-piece. In particular, the length of the focus zone and/or its position within the work-piece may be adapted. In general, it is noted, that, due to different thresholds for the nonlinear absorption, a focus zone with assumed identical intensity may cause differently large modifications in differing materials.

The aspect ratio relates to the geometry of the beam profile (the focus zone) within the to be processed material as well as the geometry of the modification created with a beam profile. For asymmetric or in lateral direction modulated (for example, non-rotationally symmetric or ring-shaped) beam profiles, the aspect ratio is given by the ratio of the length of the modification with respect to a maximum lateral extent in the shortest direction that is present within that range of length. If the beam profile thereby includes a modulation in lateral direction, for example, for ring-shaped beam profiles, then the aspect ratio relates to the width of a maximum, for a ring-shaped beam profile, for example, to the strength of the ring. When a plurality of modification volumes, which are displaced in lateral direction, are formed, the aspect ratio relates to the lateral extent of a single modification. For a beam profile modulated in propagation direction (e.g., due to interferences), the aspect ratio relates to the higher ranking total length.

Assuming a distance d between the beam shaping element and the focusing lens (near field optics), which is in particular larger than the focal length fN of the near field optics, and an NA of the near field optics with respect to air >0.15, the used angular spectrum α of the beam shaping element can be in the range $\tan(\alpha) < f^*NA/d < NA/2$ and preferably $\tan(\alpha) > f^*NA/(d^*4)$.

The previously mentioned ranges for parameters may allow the processing of a material thickness up to, for example, 5 mm and more (typically 100 µm to 1.1 mm) with roughness of the cutting-edge Ra, for example, smaller than 1 µm.

Optical system 1 may further include a beam processing unit 13 for adapting beam parameters such as beam diameter, input intensity profile, input divergence, and/or polarization of laser beam 3. For example, the laser beam of a pulsed laser system is coupled into optical system 1 with, for example, a beam diameter of 5 mm, pulse duration of 6 ps at wavelengths around 1030 nm and is led to processing unit 13.

Figure 3:
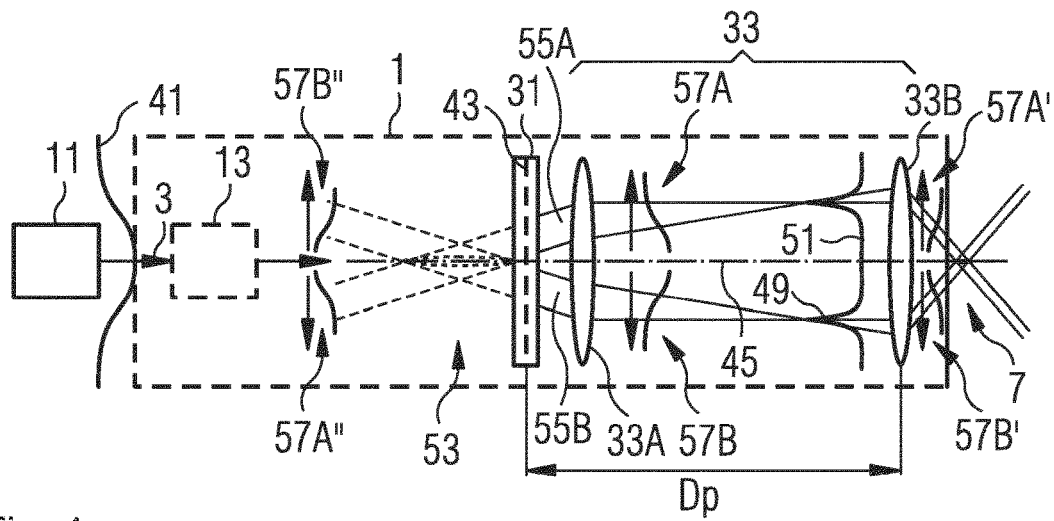
FIG. 3 is a schematic illustration of an optical system for explaining the optical functioning.

FIG. 3 shows the schematic setup of optical system 1 for explaining the functionality. Optical system 1 is based on a beam shaping element 31 and an imaging system 33. Beam shaping element 31 is adapted to receive laser beam 3. Accordingly, it is adapted to a transverse input intensity profile 41 of laser beam 3. In addition, beam shaping element 31 is adapted to impose onto laser beam 3 a beam shaping phase distribution 43 (schematically indicated by dashes in FIG. 1) over transverse input intensity profile 41. Imposed phase distribution 43 is such that a virtual optical image 53 (essentially) of elongated focus zone 7 is attributed to laser beam 3, virtual optical image 53 being located in front of beam shaping element 31. Beam shaping element 31 creates in this manner a virtual beam profile that is located upstream of beam shaping element 31, but does not correspond to the real path of the beam being at that position.

Imaging system 33 is construed such that the virtual beam profile is imaged into the area of the laser processing machine, in which the work-piece is positioned during the processing. In FIG. 3, imaging system 33 includes for that purpose and in beam direction, first focusing element, which is referred to herein as far field optics 33A, and an, in direction of the beam, second focusing element, which is referred to herein as near field optics 33B.

Far field optics 33A is provided in the area of phase imposing and is illustrated in FIG. 3 exemplarily downwards of beam shaping element 31 by a lens shape. As will be explained in the following, far field optics 33A may also be arranged shortly before beam shaping element 31, composed of components before and after the beam shaping element, and/or completely or partially integrated in the same.

After the imposing of the phase within beam shaping element 31, laser beam 3 propagates in accordance with imaging system 33 over a beam shaping distance Dp to near field optics 33B. Beam shaping distance Dp corresponds thereby to a propagation length of the laser beam 3, within which imposed phase distribution 43 transforms the transverse input intensity profile 41 into a transverse output intensity profile 51 at near field optics 33B. Herein, output intensity profile 51 includes those transverse intensity profiles in the optical system that are determined by the phase imposing. This is usually completed at the latest in the area of the focal length before the near field optics or within the area of the near field optics.

For implementing the concept of a virtual beam profile, there are the following considerations for the propagation length (from beam shaping element 31 to near field optics 33B), which laser beam 3 has to propagate within the optical system. In general, the optical system forms an imaging system 33 with a far field focusing action and a near field focusing action. The latter is determined by near field optics 33B and thereby by near field focal length fN. The first is determined by a far field focusing action and a respective far field focal length fF. Far field focal length fF can be realized by the separate far field optics 33A and/or can be integrated into the beam shaping element. See in this respect also FIG.

20. Imaging system 33 has an imaging ratio of X to 1, whereby X for a demagnification of the virtual image usually is larger than 1. For example, imaging ratios are implemented that are larger than or equal to 1:1 such as larger than or equal to 5:1, 10:1, 20:1, or 40:1. In other words, with this definition of the imaging, the factor X resembles the magnification of the lateral size of the focus zone into the virtual profile. The angle is respectively demagnified. Attention should be paid to the fact that the imaging ratio goes quadratic into the length of the profile. Accordingly, the longitudinal length of a virtual image becomes smaller, for example, for an imaging ratio of 10:1 by a factor of 100 and for an imaging ratio of 20:1 by a factor of 400.

At an imaging ratio of 1:1, there is fN=fF, an overlapping alignment of the focal planes is assumed. In general, there is fF=X fN. If the far field optics 33A is integrated into the beam shaping element, it is positioned, e.g., at a distance fN+fF from the near field optics, i.e., typically in the range of the sum of the focal lengths of both optical elements. For a 1:1 or a de-magnifying imaging system, the propagation length corresponds therefore at least to twice the focal length of the near field optics.

Separating far field optics 33A and beam shaping element 31 and assuming, that the virtual optical image should not overlap (in particular not within the intensity region being relevant for the focus zone) with the beam shaping element, the beam shaping element is arranged at at least at a distance of I/2 downward of the longitudinal center of virtual beam profile 53. Here, the length I is the longitudinal extent of virtual beam profile 53 with respect to the relevant intensity area. The longitudinal center of virtual beam profile 53 is located e.g., at the entrance side focal plane of far field optics 33A, which is located at a distance fN+fF from near field optics 33B. In this case, the propagation length is d=fN+2fF−I/2=(1+2X) fN−I/2, therefore smaller than fN+2fF=(1+2X) fN, or, in other words, smaller than the distance between the optical elements plus fF.

For the distance fN+2fF=(1+2X) fN, also for increasing beam enlargements a respectively increasing length I of virtual beam profile 53 can be imaged, whereby—as explained later—a defined end of the profile can be maintained.

In general, it is mentioned that, due to raw beam divergences and convergences as well as for deviating adjustment of the imaging system, deviations from the above considerations may occur. In contrast to a comparable image of a real intensity enhancement, i.e., images with comparable imaging ratios, the beam shaping element is located closer (see the respective discussion on FIGS. 7 and 8). A common distance therefore lies in a range (1+2X) fN≥d≥2fN.

Due to the imposed phase, transverse output intensity profile 51 includes, in comparison to input intensity profile 41, at least one local maximum 49 located outside of a beam axis 45. Local maximum 49 being located outside beam axis 45 results in a lateral energy entry into focus zone 7. Depending on beam shaping element 31, local maximum 49 of transverse output intensity profile 51 can be made rotationally symmetric with respect to beam axis 45—as indicated in FIG. 3 in the cut view—or it can be formed in an azimuthal angular range (see, e.g., FIGS. 29 and 30). Usually, the beam axis is defined by the center of gravity of the beam of the lateral beam profile. The optical system can usually be related to an optical axis, which usually runs through a symmetry point of the beam shaping element (e.g., through the center of the DOE or the tip of the reflective hollow cone axicon). For rotationally symmetric beams and a respective exact alignment, the beam axis may coincide with the optical axis of the optical system at least in sections.

The local maximum can be considered a generic feature of output intensity profile 51, where in particular for inverse quasi-Bessel beam shapes, a typical substructure with a steep and slowly falling flank can be formed. That substructure can invert itself due to the focusing action of the beam forming element and/or the far field optics in the range of an associated far field focal plane. In particular, the output intensity profile can show within the range of that far field focal plane the local maximum particularly "sharp" or, for example, for inverse quasi-Bessel beam shapes, the local maximum can form itself quite fast after the beam forming element. However, the aspects of the substructure may vary due to the various possibilities in the phase imposing.

The concept of a virtual beam profile can, on the one side, reduce the constructional length of optical system 1 and, on the other side, it can avoid the formation of an elongated beam profile with significant intensity enhancement within optical system 1. Imaging system 33 is configured such that, within optical system 1, the far field of the virtual beam profile is formed and that the focusing in the near field optics 33B can be done using a common focusing component such as a lens, a mirror, a microscopic objective, or a combination thereof. In that case, "common" is understood herein in the sense of that the characteristic beam shape is essentially imposed by beam shaping element 31 and not by near field optics 33B.

In FIG. 3, a path of the beam is indicated for illustration that corresponds to a beam herein referred to as an inverse quasi-Bessel beam. For that purpose, the path of the beam is illustrated downstream of beam shaping element 31 with solid lines. Upstream of beam shaping element 31, instead of incident collimated beam 3, the virtual beam profile is sketched in analogy to a real quasi-Bessel beam by dashed lines.

Similar to a common quasi-Bessel beam, also the inverse quasi-Bessel beam has a ring structure in the focal plane of far field optics 33A. However, divergent beam areas 55A, 55B indicated in the schematic cut view, which impinge on far field optics 33A, do not result from a "real" quasi-Bessel beam profile, but they result directly from the interaction of beam shaping element 31 with incident laser beam 3. Due to the direct interaction, beam areas 55A, 55B are shaped in their lateral intensity distribution by transverse beam profile 41 of laser beam 3. Accordingly, for a Gaussian input beam, the intensity decreases in the radial direction principally in beam areas 55A, 55B from the inside to the outside. Due to the divergence of beam areas 55A, 55B, typically an area of low (in the ideal case no) intensity is formed accordingly on the beam axis for the phase-modulated beam portions. In that case, the divergence of a beam portion, accordingly also a divergent beam portion, relates herein to a beam portion that moves away from the beam axis. However, in that area, a beam portion of a phase unmodulated beam and/or also an additional, phase-modulated beam portion may be superimposed. With respect to the development of the beam within the optical system during the shaping of an inverse Bessel beam, it is referred to the description of FIGS. 33 and 34. This intensity behavior is schematically indicated in transverse intensity courses (e.g., transverse intensity beam profile segments) 57A and 57B. It is noted that the intensity courses along the propagation length can change due to imposed phase distribution 43. At least, however, within the initial area (i.e., beam areas 55A, 55B laying close to beam shaping element 31) and due to the beam shaping element 31 acting in general as a pure phase mask, the incident intensity profile of laser beam 3 dominates the divergent phase-modulated beam portions.

For a clear explanation of an inverse quasi-Bessel beam, further intensity courses 57A' and 57B' are schematically indicated in FIG. 3. Here, it is assumed that beam shaping element 31 influences only the phase and not the amplitude. One recognizes that the focusing by far field optics 33A (or the respective far field action of beam shaping element 31) reverses the intensity course at the exit of optical system 1 such that, during the formation of elongated focus zone 7 on beam axis 45, at first low intensities are superposed, which originate from the decreasing flanks of the incident Gaussian beam profile. Thereafter, the higher intensities superpose, which originate from the central area of the incident Gaussian beam profile. In this context it is noted that not only the intensity on the beam shaping element, but also the contributing area has to be acknowledged. For rotationally symmetry, the distance enters accordingly quadratic. As in particular illustrated in connection with FIG. 4, the longitudinal intensity profile ends exactly in that area, in which the beam portions from the center of the input profile cross. In the center, although the highest intensity is present, the area goes to zero. Moreover, it is noted that, after the focus zone, a reversed intensity course is present again, which corresponds to intensity courses 57A, 57B after the beam shaping element (assuming no interaction with a material).

Due to imaging with imaging system 33, there are incident virtual intensity courses 57A" and 57B", which are accordingly schematically indicated with respect to the virtual beam shaping in FIG. 3. Those correspond in principle to intensity courses 57A' and 57B'.

Those intensity courses, which are inverted in comparison to a quasi-Bessel beam, cause a specific longitudinal intensity course for the inverse quasi-Bessel beam for focus zone 7 as well as in the virtual beam profile, i.e., optical image 53, because here the superposition of beam portions 55A, 55B is done virtually. For the respective discussion of the intensity course for a conventional quasi-Bessel beam, it is referred to FIGS. 7 and 8 and the respective description.

Figure 4:
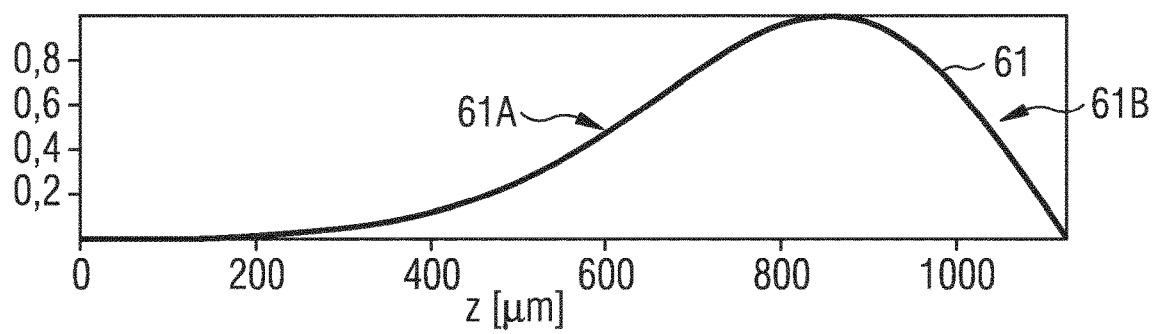
FIG. 4 is an example of a longitudinal intensity distribution in an elongated focus zone after imaging a virtual optical image.

FIG. 4 exemplarily illustrates a longitudinal intensity distribution 61 within elongated focus zone 7 as it can be calculated for the imaging of virtual optical image 53 of an inverse quasi-Bessel beam shape. Depicted is a normed intensity I in Z direction. It is noted that a propagation direction according to a normal incidence (in Z direction) onto material 9 is not required and, as illustrated in connection with FIG. 2, can take place alternatively under an angle with respect to the Z direction.

One recognizes in FIG. 4 an initially slow intensity increase 61A over several 100 micrometer (initial superposition of low (outer) intensities) up to an intensity maximum, followed by a strong intensity decrease 61B (superposition of the high (central) intensities). For an inverse Bessel beam shape, the result is therefore a hard border of the longitudinal intensity distribution in propagation direction (the Z direction in FIG. 4). As one can in particular recognize in view of intensity courses 57A' and 57B' shown in FIG. 3, the hard border is based on the fact that the end of longitudinal intensity distribution 61 relies on the contributions of the beam center of the incident laser beam having admittedly a lot of intensity, but on a strongly reduced (going to zero) area. In other words, the end relies on the imaging of a virtual beam profile in which in the center for the inverse quasi-Bessel beam a hole is created. The strong gradient at the intensity decrease at the end relies on the high intensity in the center of the input profile, limited, however, by the disappearing area. For an ideal imaging system, the longitudinal extent of intensity distribution 61 is defined by the position of the virtual profile and the imaging scale. If in addition the work-piece includes a large refractive index, the beam profile is accordingly lengthened.

In this context it is added that the hard border has the consequence in laser processing machines that the, in propagation direction, front end of a modification is essentially stationary in propagation direction also if the incident transverse beam profile is increased. The modification changes its extent only in the back part, i.e., it can lengthen in direction to the near field optics, if the input beam diameter of the laser beam enlarges. A once set position of the hard border with respect to the work-piece support or the work-piece itself can thereby avoid high intensities downstream of the modification. In contrast thereto, an enlargement of the input beam diameter, when imaging a real intensity enhancement, causes an elongation of the modification in propagation direction, i.e., for example into a work-piece support, which can result in damages of the same.

Figure 5:
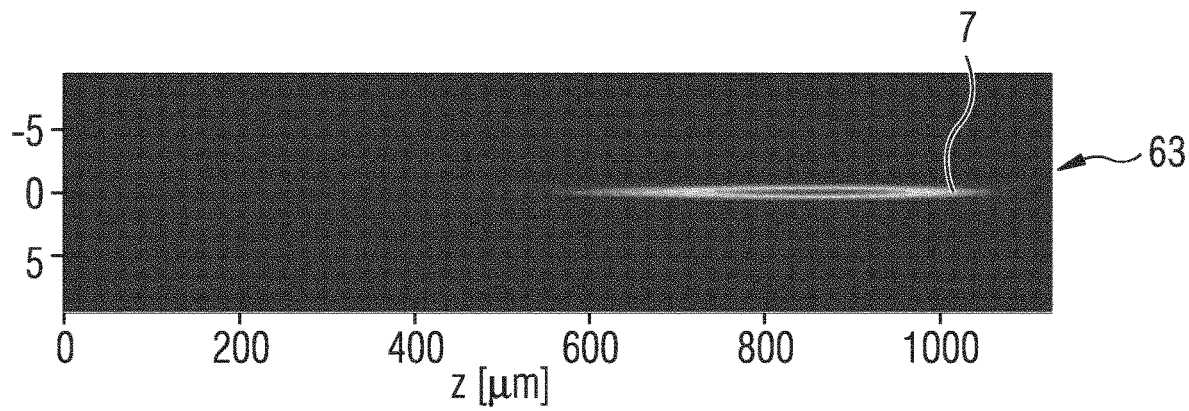
FIG. 5 is a ZR-section of the longitudinal intensity distribution shown in FIG. 4.

FIG. 5 shows an exemplary X-Y-cut 63 of the intensity within focus zone 7 for the longitudinal intensity distribution 61 shown in FIG. 4. It is noted that herein some grayscale illustrations such as FIGS. 5, 30, 31, 40, 45, 46, and 50 are based on a color illustration so that maximum values of the intensity/amplitude can be illustrated dark. For example, the center of focus zone 7 (highest intensity) in FIG. 5 is shown dark and is surrounded by a brighter area of lower intensity. The same applies, for example, to focus zone 707 in FIGS. 30 and 31 and for focus zones 1007A and 1007B in FIG. 50. One recognizes the elongated formation of focus zone 7 over several hundred micrometers at a transverse extent of some few micrometers. Together with the threshold behavior of the nonlinear absorption, such a beam profile can cause a clearly defined elongated modification within the work-piece. The elongated shape of focus zone 7 includes, for example, an aspect ratio, i.e., the ratio of the length of the focus zone to a maximal extent in the lateral shortest direction being present within that length—the latter for non-rotationally symmetric profiles, in the range from 10:1 to 1000:1, e.g., 20:1 or more, for example 50:1 to 400:1.

If one frees oneself from the beam shape—shown in FIG. 4—of an inverse quasi-Bessel beam, which is not modified in propagation direction with respect to amplitude, beam shaping element 31 can additionally create an amplitude redistribution in the far field, which e.g., can be used for an intensity modification in propagation direction. However, the thereby created intensity distribution in front of focus zone 7 can no longer be presented in a very clear manner. Nevertheless, often initial stages of inversions will show up in the beginning region or in the end region of the longitudinal intensity profile, for example a slow increase and a steep decrease. However, a (phase caused) amplitude redistribution by the phase description of beam shaping element 31 may just exactly be set to an inverted intensity distribution, in order to cause, for example, a form of a longitudinal flat top intensity profile.

Additionally, the following feature for distinguishing from a "real" beam shape may be maintained: For the case of a real Gaussian input beam, there exists, e.g., for a real Axicon, a plane between near field optics and focus zone at which the demagnified Gaussian transverse beam profile of the input beam is present and can accordingly be made visible. A respective imaging exists for the virtual optical image. However, in this case, the image plane, in which the demagnified Gaussian transverse beam profile is present, lies behind the focus zone. The transverse beam profile can accordingly be made visible. This applies generally to phase masks for the herein disclosed inverse beam shapes, if those are illuminated with a Gaussian beam profile. Specifically, the demagnified Gaussian transverse beam profile is positioned in the image plane of the beam shaping element and therefore usually directly downstream of the focus zone. Due to the already performed divergence, it is therefore significantly larger than the transverse beam profile of the inverse quasi-Bessel beam in the focus zone. Also, it is much lower in the intensity.

One can recognize the position of the imaged Gaussian transverse beam profile of the input beam by a fast turn up of the structure of the beam profile, i.e., a strong change over a small lateral area. For example, the transverse intensity profile of the inverse quasi-Bessel beam is present in the focus zone. When passing through the image plane of the beam shaping element, then "quasi" immediately the dark spot in the center is formed. For an inverse quasi-Bessel beam, this is different at the beginning of the focus zone. There, due to the increased superposition of the border areas of the Gaussian beam profile, a slow transition is made from a dark center to the transverse intensity profile of the inverse quasi-Bessel beam, which is filled in the center. In other words, in longitudinal direction, the intensity increases over a larger area then it decreases at the end. At the end, that transition is accordingly clearly sharply limited. It is added that, when imaging a real Bessel intensity enhancement, the behavior at the end and the behavior at the beginning are interchanged, i.e., at the end of the Bessel beam profile, the dark spot forms more slowly.

As previously explained, the concept of using a virtual beam profile therefore has an effect inter alia on the phase imposing to be applied and the resulting intensity courses in focus zone 7.

Figure 6:
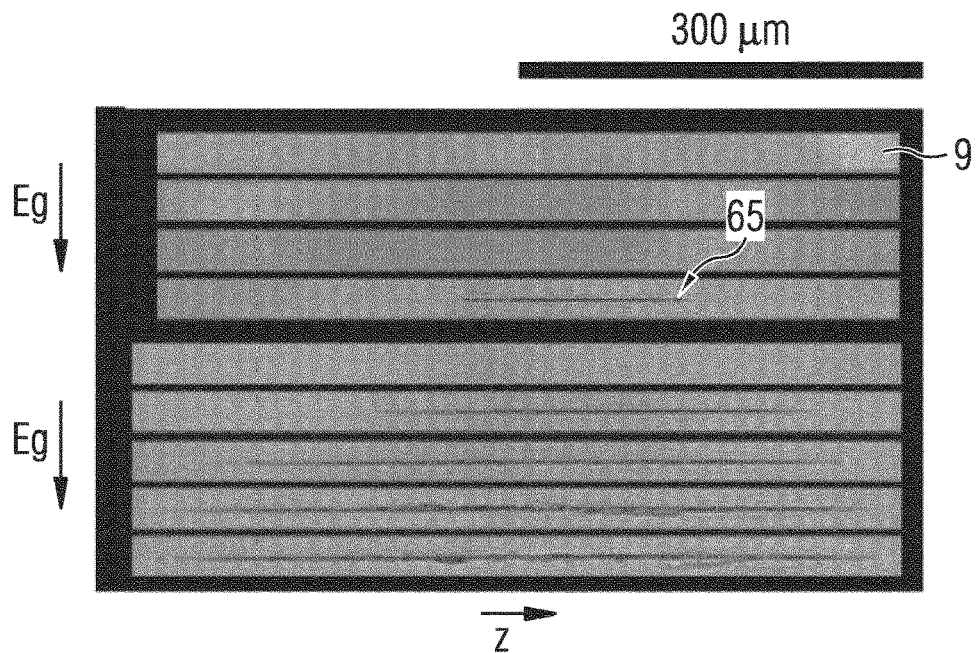
FIG. 6 is an exemplary experimental study on the modification of a transparent material in an elongated focus zone according to FIGS. 4 and 5.

FIG. 6 illustrates modification zones 65 that were created in the context of an experimental study for examining the formation of modifications in a transparent material. Each modification zone 65 goes back to the interaction with a group of laser pulses, for example two 6 ps pulses at a temporal separation of about 14 ns. The shape of the modification zones corresponds to the shape of elongated focus zone 7 as assumed in accordance with FIGS. 4 and 5. The maximal length is limited by the geometry of elongated focus zone 7 at a required intensity/fluence.

The upper four images illustrate the threshold behavior for pulse group energies Eg from about 200 to 40 µJ. The lower four images illustrate the shaping of the elongated modification zones 65 at pulse group energies Eg from about 30 µJ to 200 µJ. With increasing total energy Eg, the modification zone lengthens in the direction of the beam entrance (near field optics), because the threshold intensity for the nonlinear absorption is reached within a longer area of focus zone 7. The end of the modification in beam propagation direction is in its position essentially stationary, and even in particular without secondary correction of the distance of a near field optics (33B) to the to be processed work-piece. At lower energies, an initial walk in beam direction of the back end may occur due to the existing gradient in longitudinal direction, in particular if the modification threshold lies at small intensities within the beam profile. However, the walk decreases at medium and high energies, because the generation of the inverse quasi-Bessel beam profile includes in propagation direction an implicit maximal back end.

A similar behavior in the change of the longitudinal extent of the modification is also created for a radially increasing beam diameter of incident laser beam 3. Also in that case, the modification zone is lengthening in direction of the beam entrance (near field optics), because the intensity areas of incident laser beam 3, which are added in a radial direction at the outside, guide energy into the longitudinal intensity area in the area of slow intensity increase 61A (i.e., intensity increase with slow gradient). The maximum of the intensity distribution will accordingly be shifted in direction of the beam entrance. The end of the modification in beam propagation direction is in contrast in its position essentially stationary, because that position is supplied with energy by the center of the beam of incident laser beam 3. In addition, it is noted that this behavior can be observed also for modified inverse quasi-Bessel beam shapes. For example, for a flat top beam shape as discussed in connection with FIGS. 23 to 26, the position of the end of the modification would essentially not change for a change in the beam diameter. For such a changed incident intensity profile, the beam shaping element may further eventually no longer result in an optimized flat top structure so that this may result in modulations in the intensity and eventually a variation of the beginning.

Figure 7:
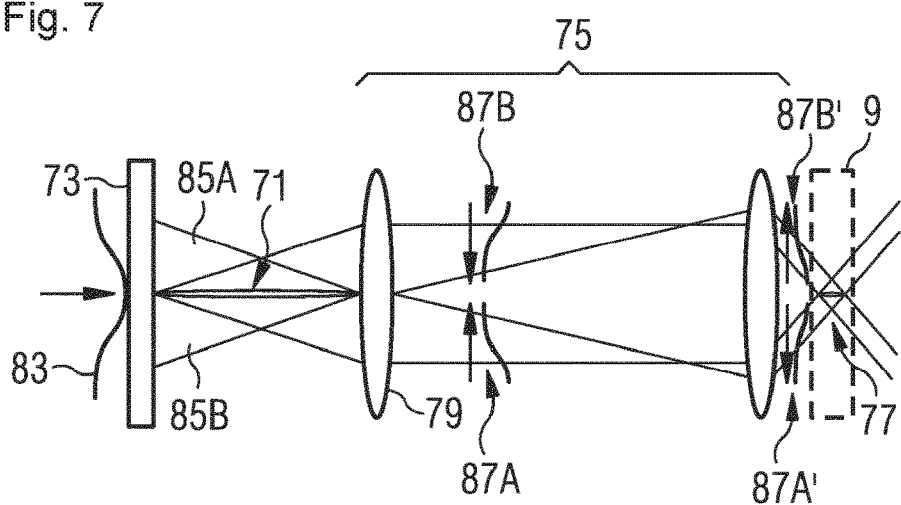
FIG. 7 is a schematic illustration for explaining the generation and imaging of a real intensity enhancement.

FIG. 7 serves as an illustration of a beam guidance at which a real intensity enhancement 71 is generated by a beam shaping optics 73 such as an axicon. This corresponds to the known formation of a quasi-Bessel beam. Intensity enhancement 71 is then imaged by a telescope 75 into work-piece 9 by forming a focus zone 77. As shown in FIG. 7, in such a setup, there is the danger that the real intensity enhancement 71 damages a far field optics 79 of telescope system 75, in particular if a small setup length is to be realized. The herein disclosed optical system (see, e.g., FIG. 3), which implements the concept of a virtual image, bypasses that risk of a damage to the beam guiding optics.

Figure 8:
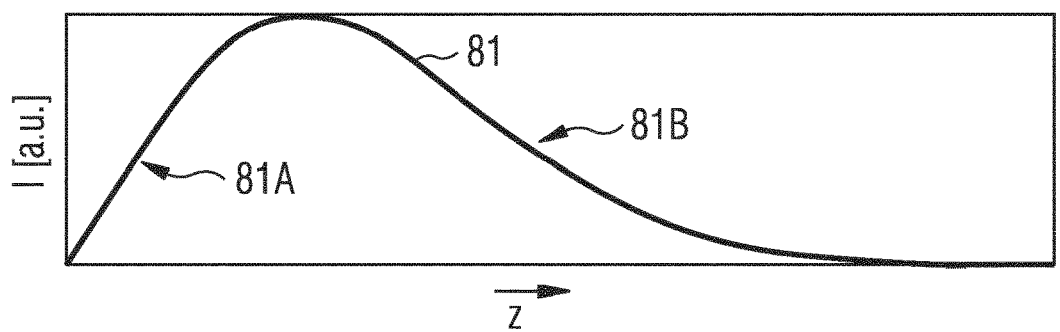
FIG. 8 is an example of a longitudinal intensity distribution in an elongated focus zone after imaging a real intensity enhancement according to FIG. 7.

FIG. 8 illustrates for completeness a longitudinal intensity distribution 81 in Z direction that results from the setup of FIG. 7. After an ab initio steep increase 81A, an intensity maximum is reached, beginning at which the intensity decreases again. At lower intensities, a slowly vanishing drop 81B (vanishing drop of small gradient) begins. One sees the general reversal of the longitudinal intensity distributions 61 and 68 of FIGS. 4 and 8, at which the "hard border" at the end is replaced by a "hard beginning".

For such a quasi-Bessel beam, the passing through an axicon with a laser beam having an incident Gaussian beam profile 83 will result in superposed beam portions 85A, 85B, the intensity weights of which result in real longitudinal intensity distribution 81 (at first superposition of the intensities of the central area of Gaussian beam profile 83, then superposition of lower (outer) intensities of Gaussian beam profile 83). For explaining, again schematic intensity courses 87A and 87B are indicated downstream of far field optics 79, and intensity courses 87A' and 87B' are indicated upstream of focus zone 77.

In the following, various exemplary configurations of optical systems are explained that implement the concept of virtual intensity enhancement. They include beam shaping elements in the transmission and reflection, wherein the imposing of the phase distribution is performed in particularly refractive, reflective, or diffractive. It is referred to the preceding description with respect to the already described components such as laser system 11.

In view of the distances of beam shaping optics 73 from the near field optics, the following values can apply similar to the considerations for the virtual image. For a real beam profile, one would typically position the center of the to be imaged real beam profile of length I in the entrance-side focal length of the far field optics. A typical distance would then be at least fN+2fF+I/2=(1+2X) fN+I/2, thus larger than fN+2fF, in other words, larger than the distance between the optical elements plus fF.

Figure 9:
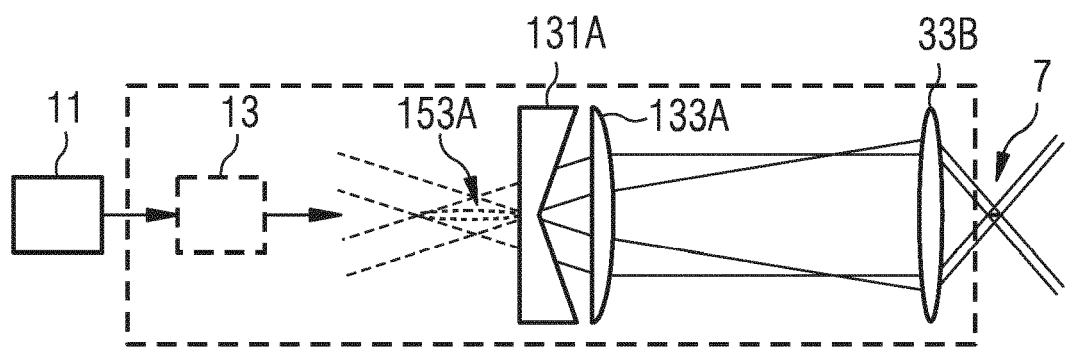
FIGS. 9, 10, 11A and 11B are schematic illustrations of examples for optical systems based on transmitting or reflective axicons.

FIG. 9 shows a refractive beam shaping with the help of a hollow cone axicon 131A. This creates a virtual inverse quasi-Bessel beam profile 153A upward of hollow cone axicon 131A. The same is indicated in FIG. 9 by dashed lines, a real intensity enhancement is not present in that area. In addition, in the embodiment of FIG. 9, the far field optics is configured in beam propagation direction downstream of hollow cone axicon 131A as plano-convex lens 133A. Near field optics 33B causes the focusing of the laser beam into focus zone 7, so that the virtual inverse quasi-Bessel beam profile 153A is related to the laser beam as virtual optical image of focus zone 7.

Figure 10:
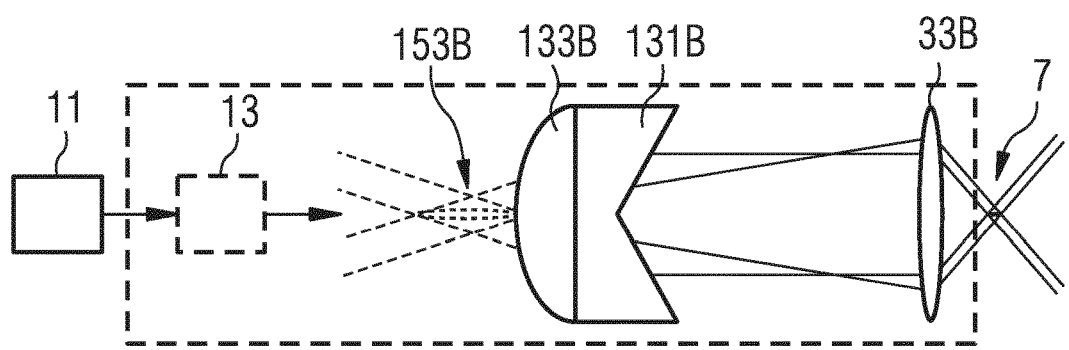

FIG. 10 shows an embodiment with a hollow cone axicon lens system 131B that is used as a refractive beam shaping element. Here, the far field optics is integrated in the beam shaping element as convex lens surface 133B, which is positioned at the entrance side of the hollow cone axicon. This setup creates similarly a virtual inverse quasi-Bessel beam profile 153B.

Figure 11A:
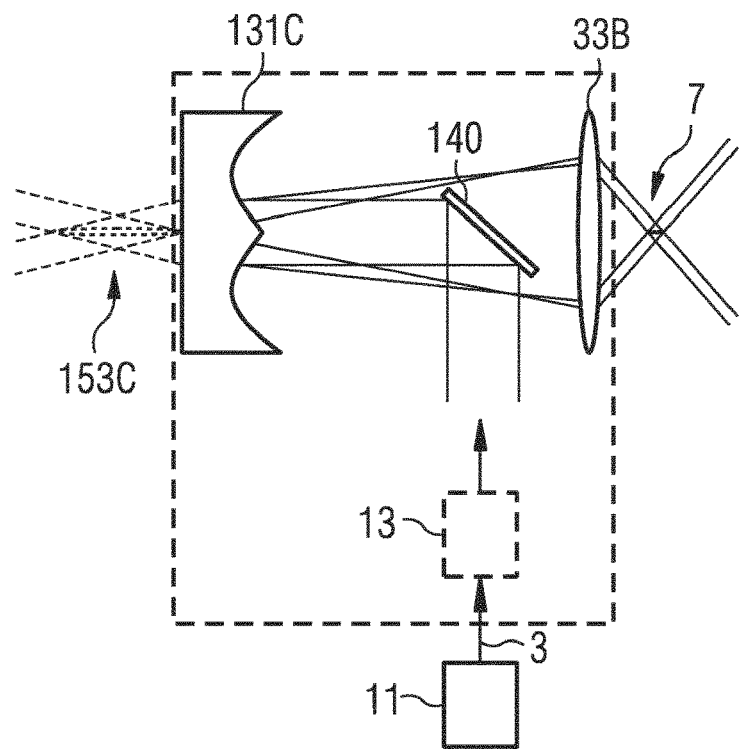

FIG. 11A illustrates an embodiment with a reflective beam shaping element, in particular a reflective axicon mirror system 131C. A highly reflective surface of the beam shaping element is shaped such that the beam shaping feature of a reflective axicon is combined with the far field forming component of a focusing hollow mirror. Accordingly, axicon mirror system 131C has the function of beam shaping as well as of the far field optics. A virtual inverse quasi-Bessel beam profile 153C is indicated at the backside of axicon mirror system 131C, thus in an area that is not passed by laser beam 3.

As is further shown in FIG. 11A, after beam adaptation unit 13, laser beam 3 of laser system 11 is coupled into optical system 1 by a deflection mirror 140. Deflection mirror 140 is, for example, arranged on the optical axis between axicon mirror system 131C and near field optics 33B and guides the beam to beam shaping element 131C. In some embodiments, the deflection mirror may, for example, be centrally drilled through to guide as less as possible light onto the central area of beam shaping element 131C, which potentially has optical errors. In addition to those aspects of filtering described in the following in connection with FIGS. 17 and 18, it is already noted at this stage that deflection mirror 140 at the same time blocks an undesired central beam portion such that the same is not focused by near field optics 33B.

Figure 11B:
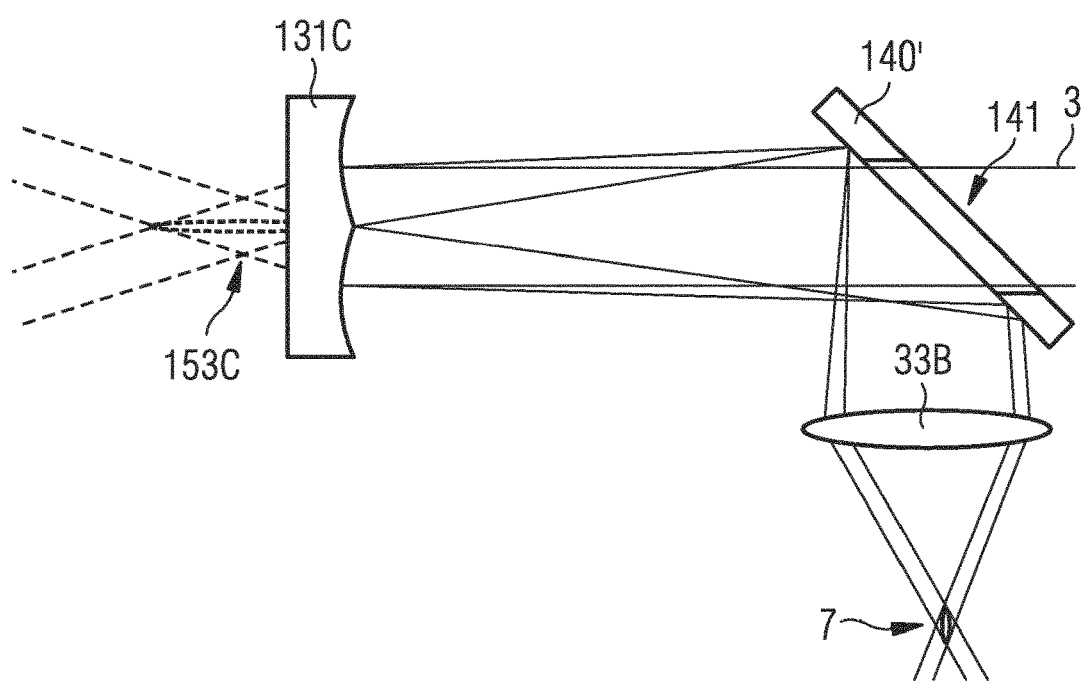

FIG. 11B shows a further embodiment of an optical system based on a reflective beam shaping element. The beam shaping element in form of reflective axicon mirror system 131C is illuminated thereby with laser beam 3 through an opening 141 of a drilled through deflection mirror 140'. That reflected and phase imposed beam impinges then after the formation of a e.g., ring-shaped far field onto deflection mirror 140'. The same guides the beam onto near field optics 33B for focusing into the elongated focus zone. The opening serves accordingly in addition as kind of a filter/diaphragm of the central area of the reflected beam.

In another embodiment with a reflective beam shaping element, the optical system includes a reflective axicon, a drilled through off-axis-parabolic mirror, and the near field optics. That reflective axicon includes for the beam shaping a conical grinded based body, the conical surface of which is coated highly reflective. The laser beam can be irradiated through the opening in the off-axis-parabolic mirror onto the reflective axicon. The reflected and beam shaped beam impinges then on the off-axis-parabolic mirror that redirects the beam on near field optics 33B and at the same time collimates the same.

Figure 12:
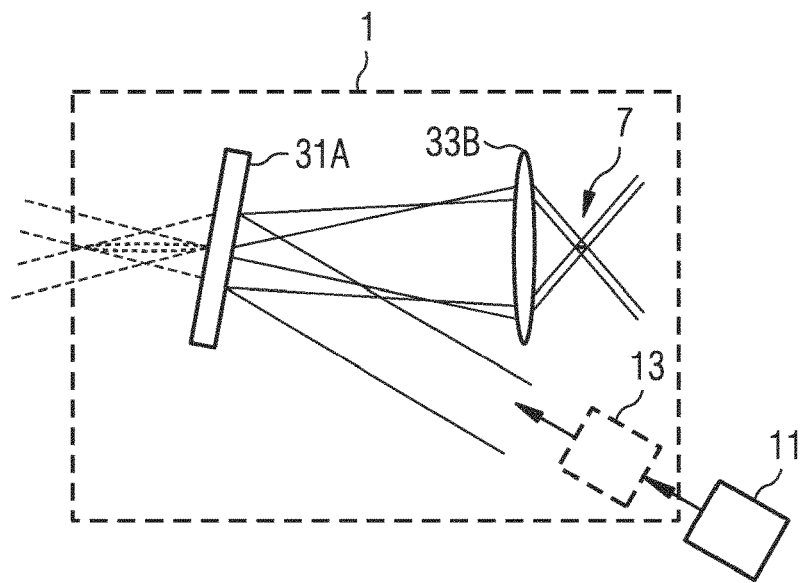
FIG. 12 is a schematic illustration of an example of an optical system based on a spatial light modulator.
Figure 13:
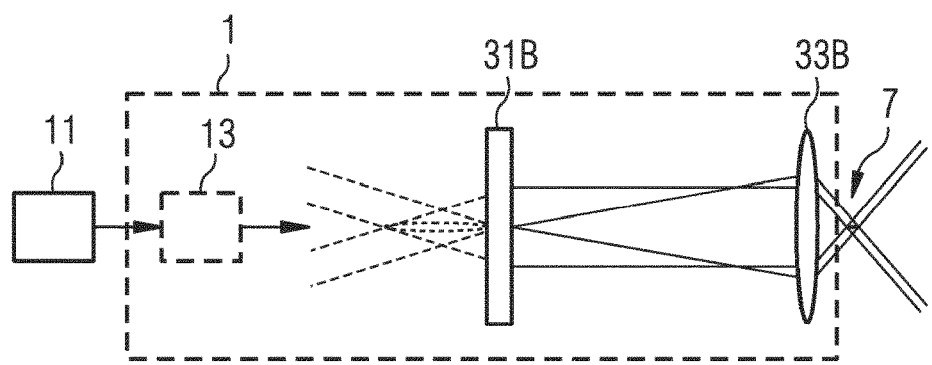
FIG. 13 is a schematic illustration of an example of an optical system based on a transmitting diffractive optical element.

FIGS. 12 and 13 show embodiments of the optical system with digitalized beam shaping elements. Here, the digitalization can relate to the use of discrete values for the phase shift and/or the lateral structure (for example, pixel structure). The use of spatial light modulators (SLMs) is one of many different possibilities to realize the beam shaping with programmable or also permanently written diffractive optical elements (DOE).

In addition to the simple generation of one or more virtual beam profiles, e.g., according to the phase imposing of one or more hollow cone axicons, diffractive optical elements allow the desired modification, for example, for homogenizing of the longitudinal intensity distribution. For this, deviations in the phase can exemplarily be used in the range equal to or smaller than 50%, e.g., equal to or smaller than 20% or equal to or smaller than 10% with respect to, for example, the hollow cone axicon phase (and thereby of an inverse quasi-Bessel beam). In general, SLMs allow very fine phase changes at a lateral rough resolution, in contrast to, for example, lithographically generated, permanently written DOEs. Permanently written DOEs include e.g., plano-parallel steps, the thickness of which determine the phase. So, the lithographic manufacturing allows a large lateral resolution. Binary steps can result in real and virtual beam profiles. Only a number of more than two phase steps can result in a differentiation in the sense of a preferred direction for the virtual beam profile. For example, four or eight or more phase steps allow an efficient beam shaping with respect to the virtual beam profile. However, the discretization can cause secondary orders that can, for example, be filtered out. Manufacturing methods for continuous microstructures include, for example, the analog-lithography or the nanoimprint-lithography.

Herein, the structural element of a diffractive optical beam shaping element, which causes the phase imposing and is configured in an areal shape, be it an adjustable SLM or a permanently written DOE, is referred to as a phase mask. Depending on the type of configuration of the DOE, it may be used in transmission or in reflection to impose a phase distribution on a laser beam.

In FIG. 12, a spatial light modulator 31A is used in reflection for phase imposing. For example, spatial light modulator 31A is based on a "liquid crystal on silicon" (LCOS) that enables a phase shift that is programmable for the individual pixels. Spatial light modulators can further be based on micro-systems (MEMS), micro-optoelectro-mechanical systems (MOEMS), or micro-mirror-matrix systems. In SLMs, the pixels can, for example, be controlled electronically to cause a specific phase imposing over the transverse input intensity profile. The electronic controllability allows, for example, the online-setting of phases and, thus, the adaptation of focus zone 7, e.g., in dependence of the to be processed material or in reaction of fluctuations of the laser. In the configuration of FIG. 12, the function of a diffractive axicon for the generation of a virtual inverse quasi-Bessel beam profile can be combined, for example, with the far field forming action of a far field optics by the phase shifting of the spatial light modulator 31A. Alternatively, a permanently written reflective DOE can be used as beam shaping element 31A.

FIG. 13 is a schematic view of an optical system based on a DOE 31B, for which the phase imposing is permanently written in DOE 31B. DOE 31B is used in that case in transmission. As in FIG. 12, the phase shift, which, for example, results in a virtual quasi-Bessel beam profile, as well as the focusing property of far field optics are combined within the DOE 31B.

The optical systems of FIGS. 9 to 13 can result in output intensity profiles that correspond to inverse quasi-Bessel beam profiles and that are attributed to virtual optical images.

Figure 14:
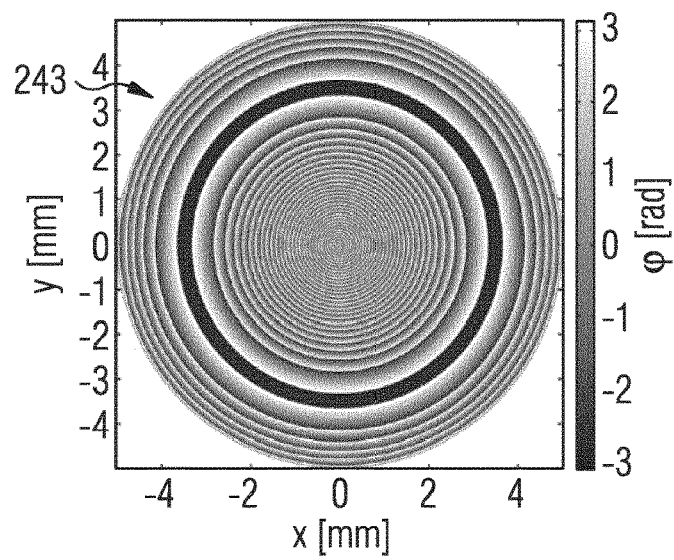
FIG. 14 is a schematic illustration of an example of a phase distribution in a diffractive optical element in an optical system according to FIG. 13.

FIG. 14 illustrates an example of a phase distribution 243 as it can be provided e.g., in DOE 31B. Phase distribution 243 is rotationally symmetric. One recognizes ring-shaped phase distributions, the frequency of which is modulated in radial direction. The rings point to the generation of a rotationally symmetric virtual quasi-Bessel beam profile. The frequency modulation points to the integration of the phase component of the far field optics in the phase distribution for beam shaping. In FIG. 14, the phases are indicated in the range of $\pm \pi$. In alternative configurations, discrete phase distributions such as binary phase distributions or multi-step (for example, 4 or more levels in the range of the phase shift from 0 to $2\pi$) phase distributions can be implemented in DOE phase masks.

Figure 15:
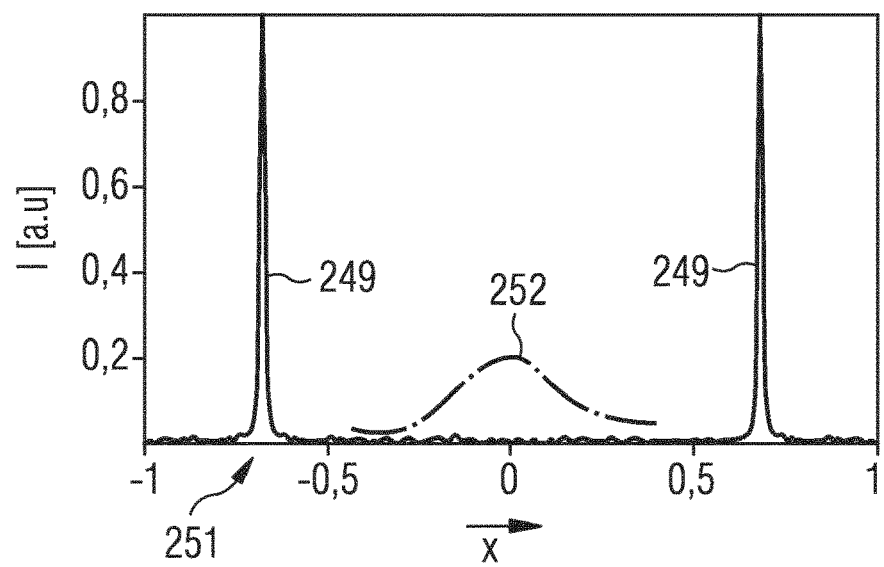
FIG. 15 is an exemplary intensity cross-section of an output intensity profile in an optical system according to FIG. 13.
Figure 16:
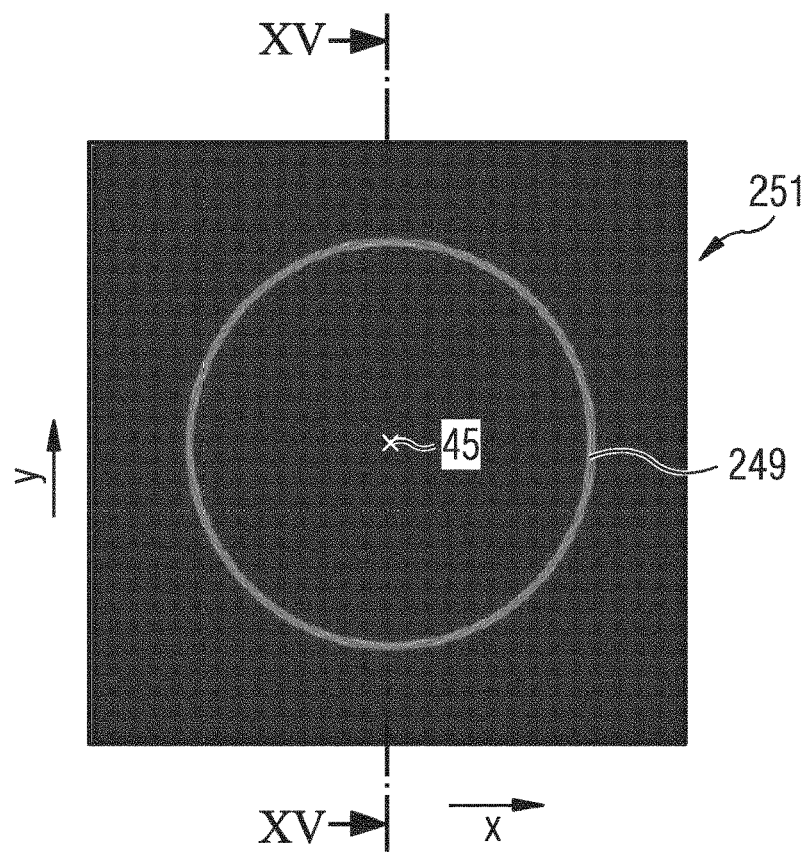
FIG. 16 is an XY-view of the output intensity profile of the intensity cross-section shown in FIG. 15.

FIGS. 15 and 16 illustrate exemplarily an output intensity profile 251 within the intensity cross-section (FIG. 15) and in the 2D-top view (FIG. 16). One recognizes an intensity maximum 249 extending in a ring shape around beam axis 45. There is hardly any intensity in the beam center.

In some embodiments, the transition into the inverse quasi-Bessel beam will not be complete such that accordingly a non-phase-modulated remaining beam, for example with a Gaussian beam shape, is superposed to the ring-shaped intensity profile. FIG. 15 indicates schematically such a non-phase-modulated beam portion 252 by a dash-dotted line.

Maximum 249 of that intensity distribution in FIG. 15 is an example of a local intensity maximum, with which an original input intensity profile (e.g., a Gaussian beam profile) was modified in the area of the transverse output intensity profile. The rotational symmetry of the ring structure is due to the rotational symmetry of the inverse quasi-Bessel beam profile. In alternative embodiments, the local intensity maximum is limited to an azimuthal angular range. In addition, a superposition of azimuthal limited and/or ring-shaped local maxima may be given.

When using a refractive hollow cone axicon (see FIGS. 9 and 10) for the generation of an inverse quasi-Bessel beam-shaped output intensity profile, undesired beam portions may be created under undesired angles for a non-perfect tip of the axicon. Also for diffractive beam shaping elements, non-desired beam portions may appear. For example, a non-phase-modulated beam portion, which cannot be neglected, or additional orders of diffraction in the far field of the laser beam can be present.

The herein disclosed optical systems simplify, by using the far field components, the insertion and the shape selection of filters to filter out such disturbing beam portions. In particular, these undesired beam portions can be separated from the desired beam portions (beam for use) in a simple manner in the area of the Fourier plane.

Figure 17:
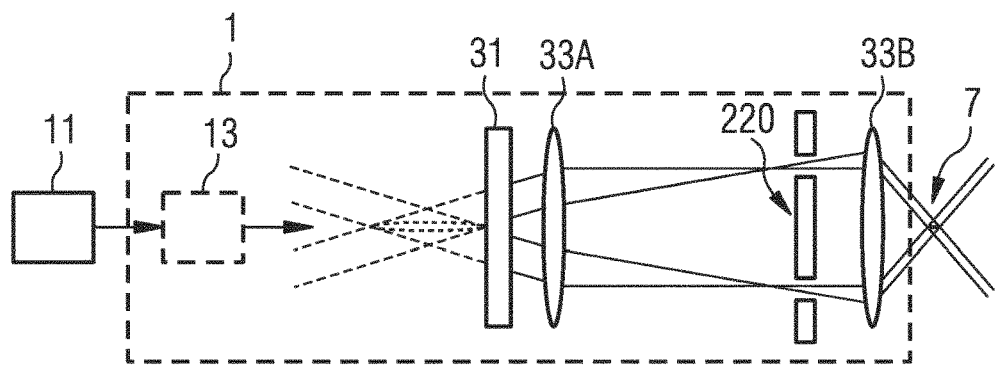
FIG. 17 is a schematic illustration of an example of an optical system with filtering non-phase-modulated beam portions.

Referring to the non-phase-modulated beam portion 252 of FIG. 15, FIG. 17 shows an exemplary optical system that is based on the optical system shown in FIG. 3. However, additionally a filtering of non-phase-modulated portions is performed in the area of the Fourier plane of imaging system 33. Exemplarily, a spatial filter unit 220 is indicated upward of near field optics 33B in FIG. 17.

Filter unit 220 includes a central area around beam axis 45 that blocks, for example, the Gaussian intensity distribution—indicated in FIG. 15—of the non-phase-modulated beam portion 252. Filter unit 220 can additionally include sections, which are located radially further outside, for blocking higher orders of diffraction by the DOE or the SLM.

In general, filter unit 220 is provided for the suppression of non-phase-modulated base modes and higher diffraction orders as well as of scattered radiation of the various herein disclosed refractive, reflective, or diffractive beam shaping elements. For rotationally symmetric output intensity profiles, usually also the filter unit is made rotationally symmetric. In some embodiments, only some portions of filter unit 220 or no filtering at all is provided.

Diffractive beam shaping elements allow a further approach for suppressing the non-phase-modulated beam portions. For this, an additional phase contribution is imposed to deflect the phase-modulated beam portion.

Figure 18:
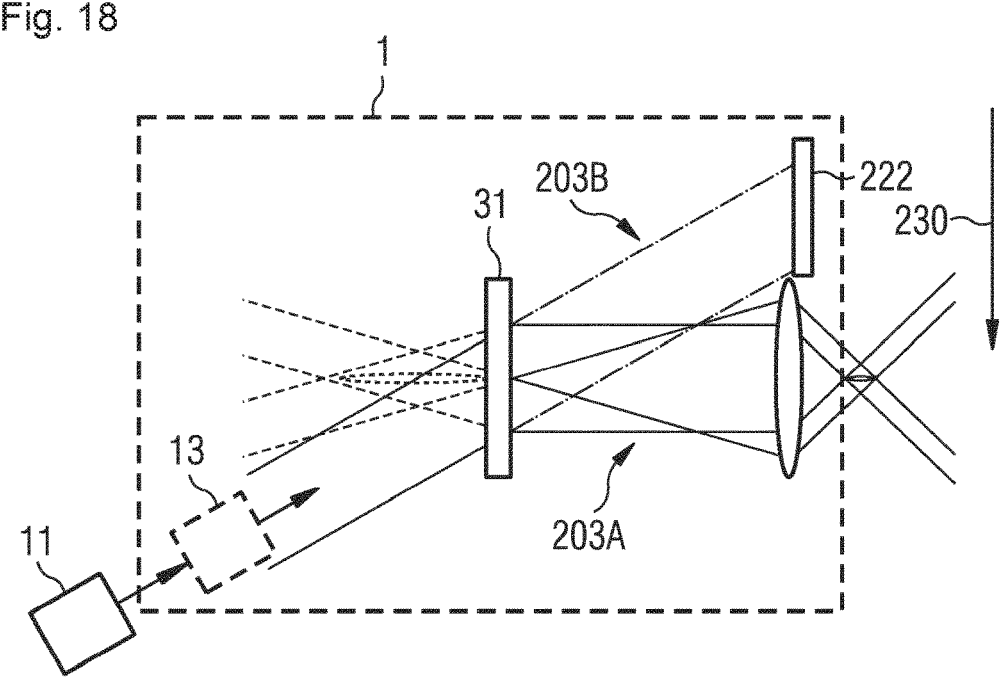
FIG. 18 is a schematic illustration of an example of an optical system based on a diffractive optical element with a linear phase contribution for separating a phase-modulated beam portion.

FIG. 18 shows, for example, an optical system in which the diffractive optical element 31 is additionally provided with a linear phase contribution. The linear phase contribution results in a deflection 230 of phase-modulated beam 203A. Non-phase-modulated beam portion 203B is not deflected and impinges, for example, on a filter unit 222.

Figure 19:
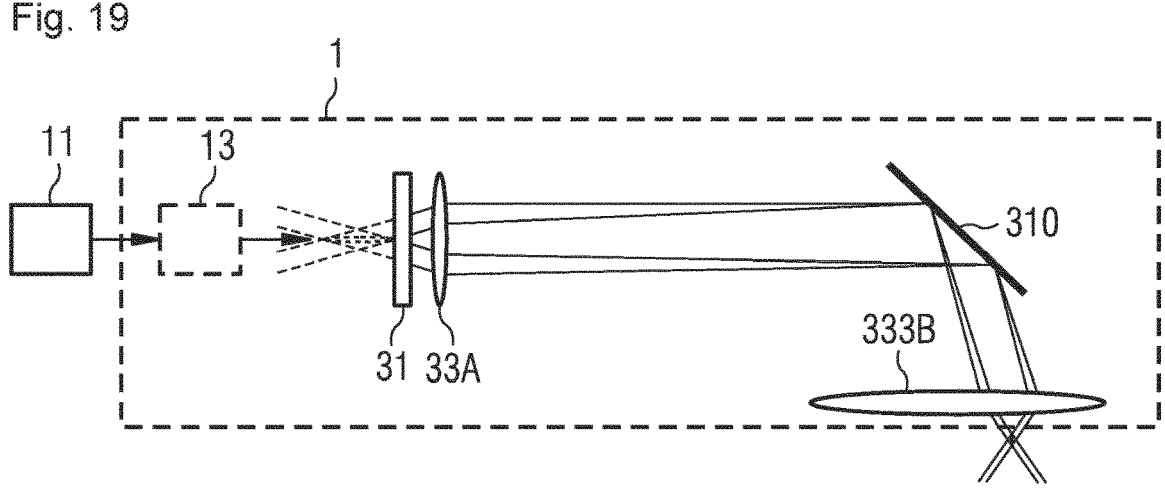
FIG. 19 is a schematic illustration of an example of an optical system with a scan device.

FIG. 19 shows a further embodiment of an optical system that utilizes the use of the far field component additionally for the implementation of a scan approach. In general, a scan system allows shifting focus zone 7 within a certain range. In general, it is possible by the separation of the beam shape from the near field focusing to provide favorable telecentric scan approaches, in particular for the volume absorption. In some embodiments, in addition the location as well as the angle can be set. Accordingly, such scanner systems can allow writing fine contours into a work-piece.

In the configuration of FIG. 19, a scanner mirror 310 is positioned at the image side focal plane of a near field optics 333B. Scanner mirror 310 deflects the laser beam in the range of the output intensity distribution onto near field optics 333B positioned at the side. The deflection in the Fourier plane results in that the propagation direction in the work-piece is preserved despite the displacement in location. The scanning region itself is determined by the size of near field optics 333B.

If scanner mirror 310 is not correctly positioned in the focal plane of near field optics 333B or if it can be moved with respect thereto, then an orientation of the elongated focus zone, in particular an angular deviation from the Z direction in FIG. 2, can be set.

Figure 20:
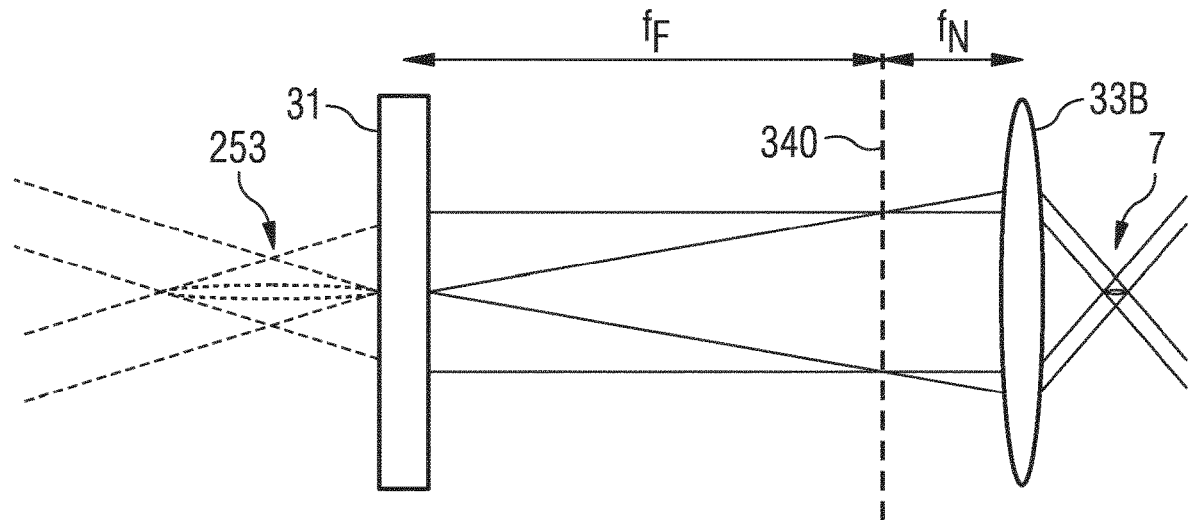
FIG. 20 is a schematic illustration for explaining the imaging system of an optical system.

With the help of a configuration in accordance with the optical system shown in FIG. 13, FIG. 20 explains exemplarily the underlying imaging features. The optical system includes a beam shaping element 31 that operates also as a far field optics and is therefore characterized by a focal length fF. In addition, the optical system includes near field optics 33B that is characterized by focal length fN. In FIG. 20, the focal planes of the far field optics and the near field optics coincide. Accordingly, in FIG. 20 only one focal plane 340 is indicated by a dashed line. In that configuration of overlapping focal planes, the imaging system images for incidence of a plane wave front generally a virtual beam shape 253 onto elongated focus zone 7, for example, an inverse quasi-Bessel beam profile, inverse modulated or homogenized quasi-Bessel beam profiles as examples for inverse quasi-Bessel/Airy beam shapes.

Though the focal planes do not need to overlap always. For example, the imaging system can be adapted to a given beam divergence, but laser beam 3 may be incident with another divergence. In those cases, still a virtual optical image being positioned in front of the beam shaping element is attributed to elongated focus zone 7, but it does not need to be a perfect imaging. A similar situation may be given for an intended misalignment of the imaging system, for example, in connection with a scanner device.

FIG. 20 illustrates in addition the terms "far field optics" and "near field optics". The far field optics creates the far field of virtual beam path 253 in the range of far field focal length fF. As previously already explained, the far field optics can be distributed in its function, for example, be made of one or more components, which are arranged before and/or after the beam shaping element and displaced with respect to the same, and/or be integrated into the beam shaping element. The near field optics focuses the beam with the smaller focal length fN in the direction of the work-piece and thereby forms the focus zone. Thus, the far field of virtual beam profile 53 with respect to the far field optics, as well as the far field of focus zone 7 with respect to near field optics 33B are positioned in the area of focal plane 340.

Also for non-perfect imaging (e.g., non-overlapping focus planes of far field optics and near field optics), essentially an acceptable intensity distribution in the focus zone can be given, because the intensity profile, which impinges onto the near field optics, changes only a little.

For example, in the case of an inverse quasi-Bessel beam shape, the first focusing by the far field optics within the optical system causes an adaptation of the ring size on the near field optics. In that manner, the far field optics has a focusing action onto the ring diameter, which, as indicated in the figures, decreases up to some type of intermediate focus.

Figure 21:
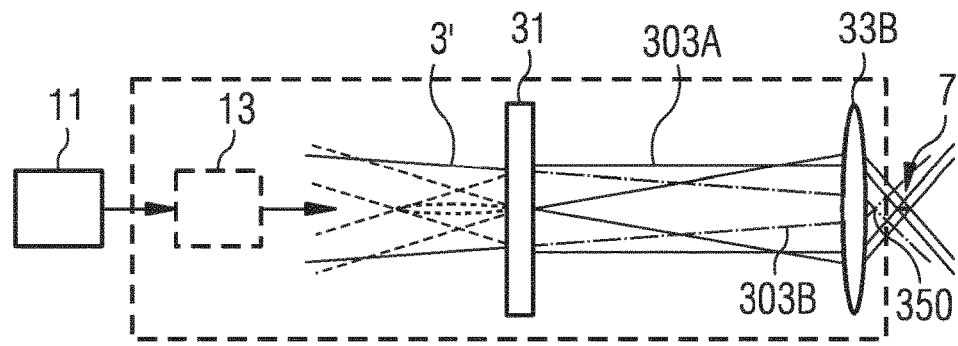
FIG. 21 is a schematic illustration for explaining an optical system for the incidence of a converging laser beam.

FIG. 21 illustrates the beam path in an optical system for the case that a convergent laser beam 3' impinges on beam shaping element 31. Phase-modulated portion 303A of the laser beam is focused onto elongated focus zone 7. Due to the convergence of incident laser beam 3' (and eventually due to a separate focusing far field optics or an integration into the phase distribution of beam shaping element 31), the non-phase-modulated portion 303B (dash dotted line) decreases further during the propagation length Dp and impinges on a central area of near field optics 33B. Thereby, a focus 350 for non-phase-modulated beam portion 303B is formed that is closer to near field lens 33B than it is elongated focus zone 7. The non-phase-modulated portion is strongly divergent after focus 350, so that those intensities are no longer reached within the work-piece with respect to the non-phase-modulated beam portion 303B that result in nonlinear absorption. In such a configuration, one can do without filtering non-phase-modulated beam portions 303B.

Nevertheless, a spatially localized filter unit can be provided in the area of focus 350 (or even between far field optics and near field optics, if the beam is strongly focused) such that non-phase-modulated beam portion 303B is kept out of the interaction zone and the work-piece.

Figure 22:
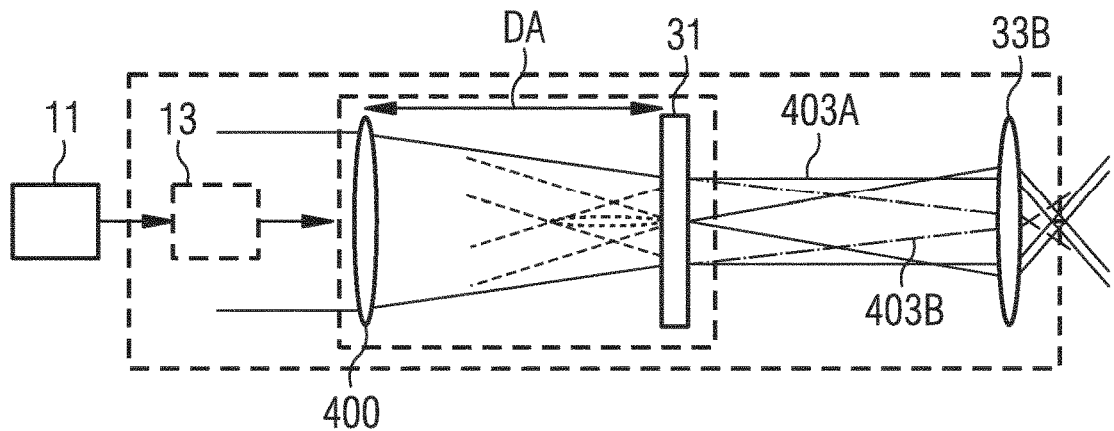
FIG. 22 is a schematic illustration for explaining an optical system with adaptation of the divergence.

FIG. 22 shows an optical system that is equipped with an additional lens 400 upstream of beam shaping element 31. Lens 400—as an example of an additional focusing component—is located at a distance DA to beam shaping element 31.

Beam shaping element 31 has a phase distribution that is set for a specific beam diameter. The illuminated part of that beam shaping element, i.e., the beam diameter of the input intensity profile at beam shaping element 31, can be adapted by the translatability of lens 400 with respect to beam shaping unit 31.

In some embodiments, lens 400 can be compensated before beam shaping element 31 within the phase mask of beam shaping element 31 so that the imaging does not change and only the 0. order, i.e., the non-phase-modulated, portion is focused.

In general, lens 400 can also be understood as a component of the far field optics. If the far field optics includes a plurality of components, which can be translated with respect to each other and with respect to the near field optics, then the imaging scale can be changed by a suitable translation. In some embodiments, lens 400, the beam shaping element, or both can be translated together to adjust the imaging scale of optical system 1. In some embodiments, lens 400 can be used as a first telescope-part-lens for adapting the beam diameter on the beam shaping element, whereby a second telescope-part-lens is calculated into the phase mask.

In some embodiments, lens 400 can be translated to perform a fine adjustment of the raw beam in particular for a longitudinal flat top beam shape or multi-spot formation.

If the input beam is selected such that a convergent or divergent beam is present at beam shaping element 31, then one can—also in this case in accordance with FIG. 21 under certain conditions—do not use a filter unit for non-phase-modulated beam portion 403B. I.e., intensities for the non-linear absorption within the work-piece are only reached by the phase-modulated beam portion 403A.

Diffractive optical elements allow a digitalized and e.g., pixel based phase adaptation over the input intensity profile. Starting from the intensity distribution of an inverse quasi-Bessel beam shape, a longitudinal flat top intensity profile can, for example, be generated in focus zone 7. For that purpose, the phase distribution within the beam shaping element can be influenced such that intensity contributions in the output intensity profile are taken out of the area, which forms the intensity maximum and the tails of the Bessel beam, and are radially redistributed by a phase change such that, for the later focusing by near field optics 33B, the increasing area 61A and the decreasing area 61B are magnified or far extending tails are avoided to the most part (e.g., by pushing power from the tails into the homogenized area).

Figure 23:
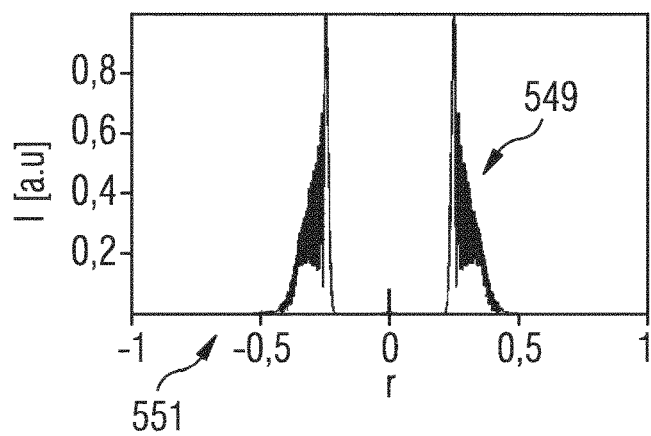
FIG. 23 is an exemplary cross-section of the intensity of an output intensity profile in an optical system for generation of a flat-top intensity profile.
Figure 24:
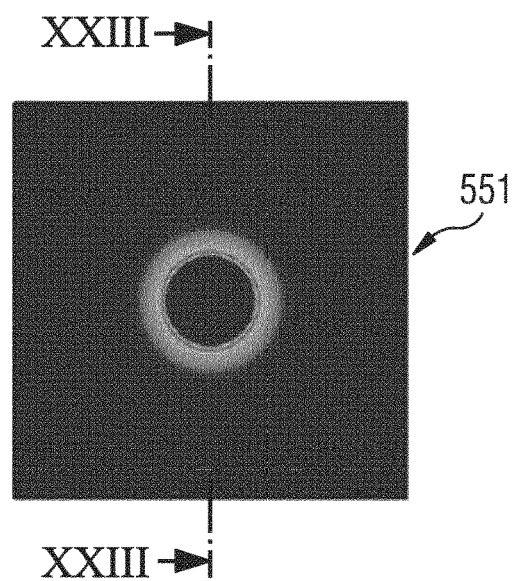
FIG. 24 is an XY-view of the output intensity profile of the intensity cross-section shown in FIG. 23.

A respective output intensity profile 551 is shown in FIG. 23 (intensity cross-section) and FIG. 24 (2D-top view). One recognizes in the intensity cross-section of FIG. 23 that—in comparison to FIG. 15—the local maximum is broadened in the radial direction and modulated. The result is a respectively radially extended modulated ring structure 549.

Figure 25:
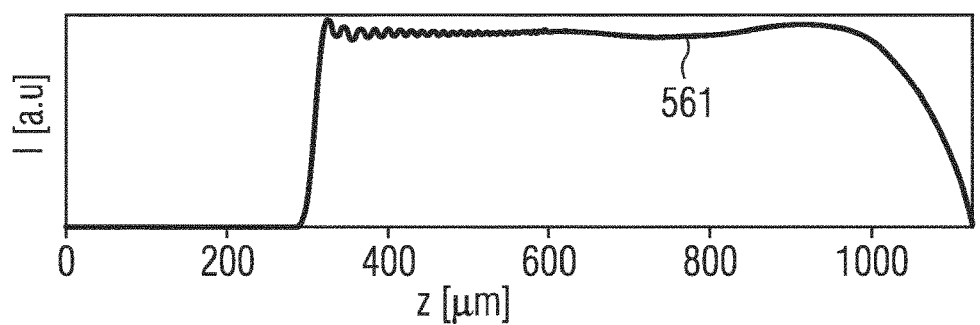
FIG. 25 is an example of a longitudinal intensity distribution that results from the output intensity profile of FIGS. 23 and 24.

FIG. 25 shows the focusing of such an output intensity distribution 551. The result is a longitudinal quasi-homogenized intensity distribution (flat top) 561 over a range from about 700 μm in Z direction.

Figure 26:
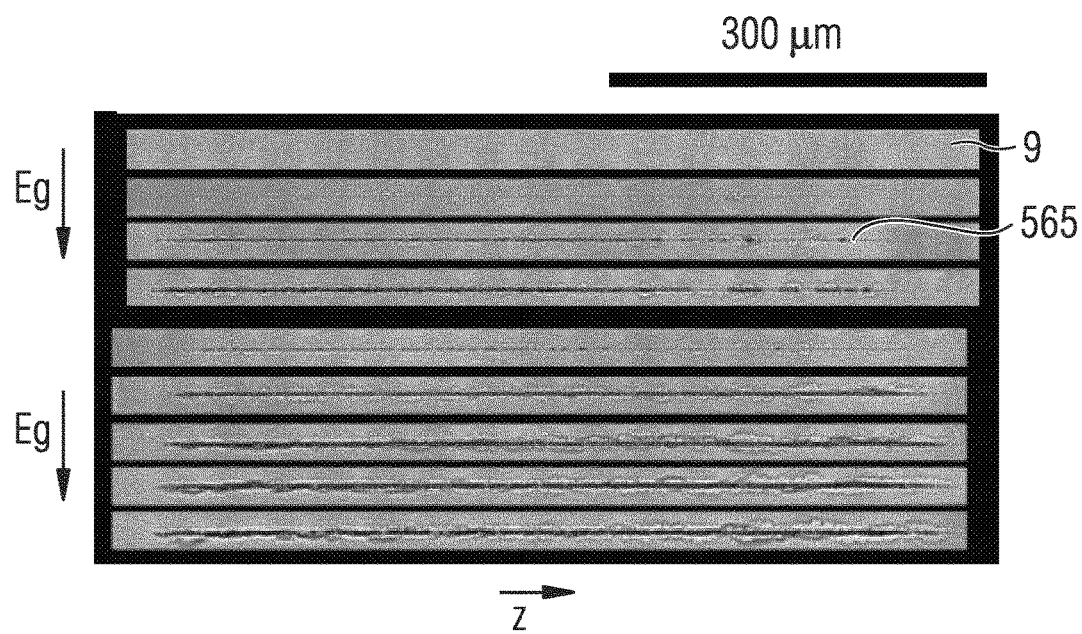
FIG. 26 is an exemplary experimental study on the modification of a transparent material in an elongated focus zone according to FIG. 25.

In analogy to FIG. 6, FIG. 26 shows modification zones 565 (modifications) in a transparent material 9. The upper four images illustrate again the threshold behavior for pulse group energies Eg from about 20 μJ to 40 μJ, while the lower four images show increasing pulse group energies Eg from about 30 μJ to 200 μJ. One recognizes that, when the threshold is passed, the modification zones form essentially always over the same range of extent in Z direction within work-piece 9. This is based on the essentially constant intensity having only a short increase and drop off. With increasing energy, however, not only the strength but also the lateral extent of the modification zones increases.

Figure 27:
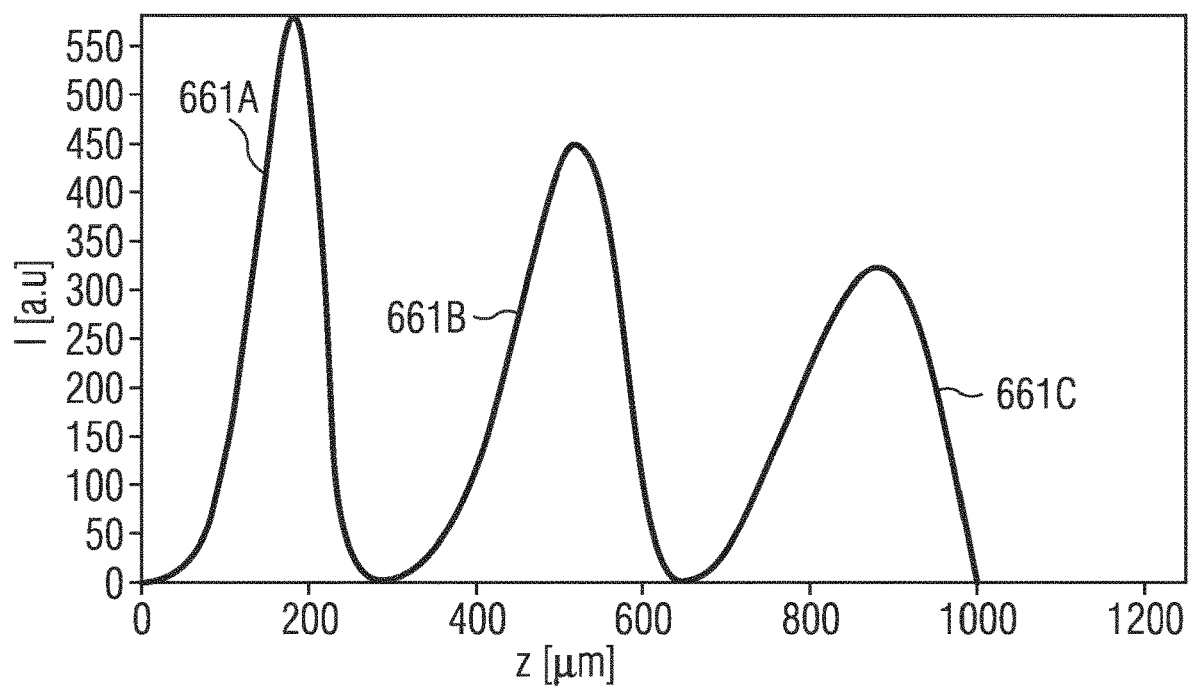
FIG. 27 is an example of a longitudinal intensity distribution when using a multifocal near field optics.

Another embodiment is shown in FIG. 27, which allows reaching a sequence of intensity enhancement in propagation direction. In general, supplemental phase imposing can be done in the area of the image side focal plane of near field optics 33B such as lateral and/or longitudinal multi-spot phase imposing. Specifically, one recognizes in FIG. 27 a sequence of three intensity maxima 661A, 661B, and 661C, which each have an intensity distribution in accordance with FIG. 4.

This sequence can be generated by a longitudinal multi-spot phase imposing or the use of a multi-focal lens as near field optics 33B. So, for example, an additional diffractive optical element may be provided in the area of the Fourier plane (focal plane of near field optics 33B) or close to near field optics 33B, which provides an additional phase-modulation for the three foci. Such phase adaptations are known, for example, from EP 1 212 166 B1, the entire contents of which are incorporated by reference.

In connection with FIGS. 28 to 31, a further potential formation of an elongated focus zone is illustrated for the case of an accelerated Airy beam shape.

Figure 28:
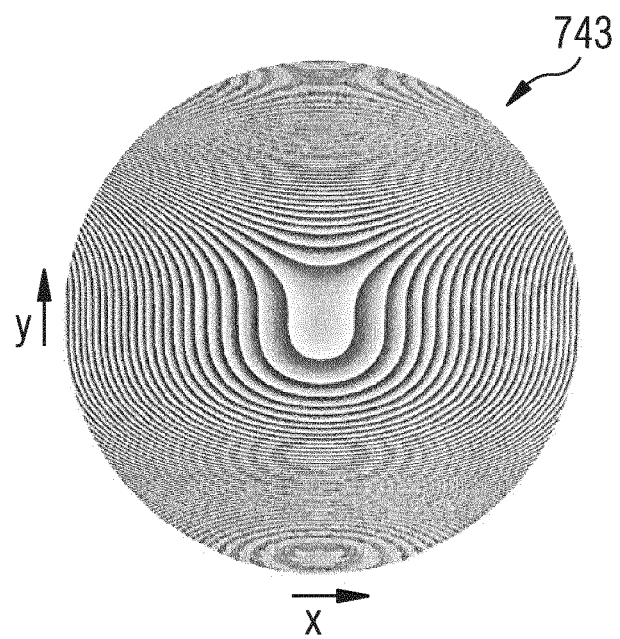
FIG. 28 is a schematic illustration of an example of a phase distribution for generating an inverse Airy beam (e.g., inverse quasi-Airy like beam) shape with a diffractive optical element for use in an optical system according to FIG. 13.

FIG. 28 shows a phase distribution 743 as it can be imposed within beam shaping element 31 onto the input intensity profile. Here, face distribution 743 includes the phase distribution, which is required for a generation of the accelerated beam, and the phase distribution of a concave lens, which compensates a raw beam convergence. In general, a phase mask of an accelerated beam creates a well collimated beam which does not change significantly over the propagation distance and which is then focused with the near field component in a so-called accelerated beam shape.

Figure 29:
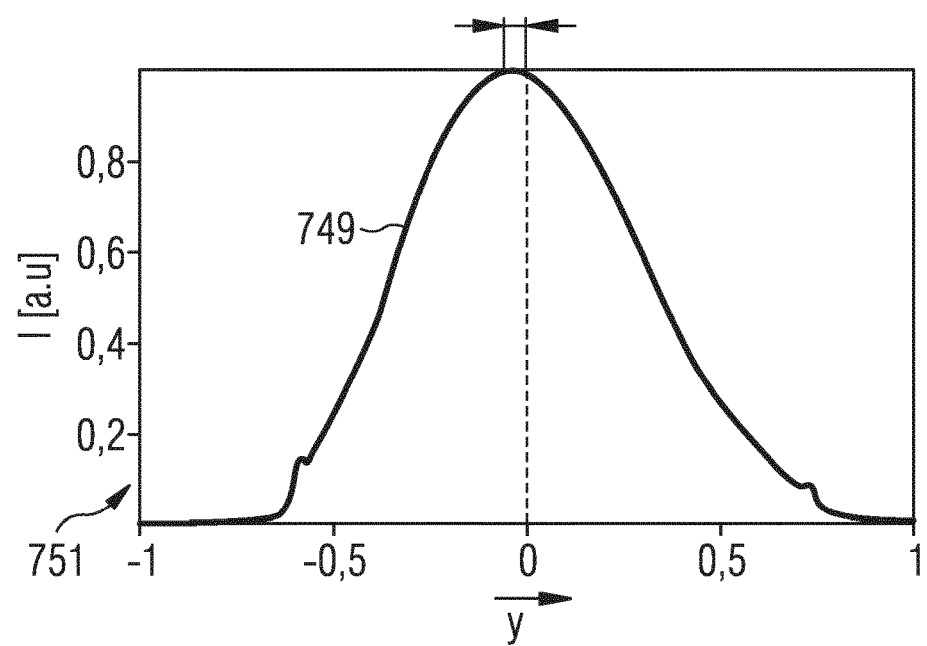
FIG. 29 is an exemplary intensity cross-section of an output intensity profile for generating the inverse Airy beam shape according to FIG. 28.
Figure 30:
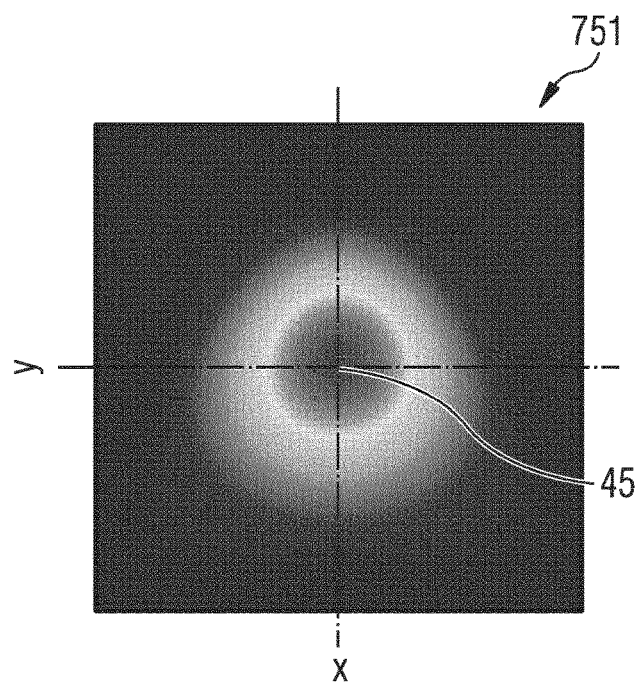
FIG. 30 is an XY-view of the output intensity profile of the intensity cross-section shown in FIG. 29.

FIGS. 29 and 30 illustrate the associated output intensity profile 751 in the cut view (FIG. 29) and in the top view (FIG. 30). One recognizes that the intensity maximum is displaced slightly from the center (i.e., beside the beam axis 45) in Y direction. Thus, the transverse output intensity profile 751 is modified with respect to the input intensity profile with a local maximum 749, which is located outside of beam axis 45.

Figure 31:
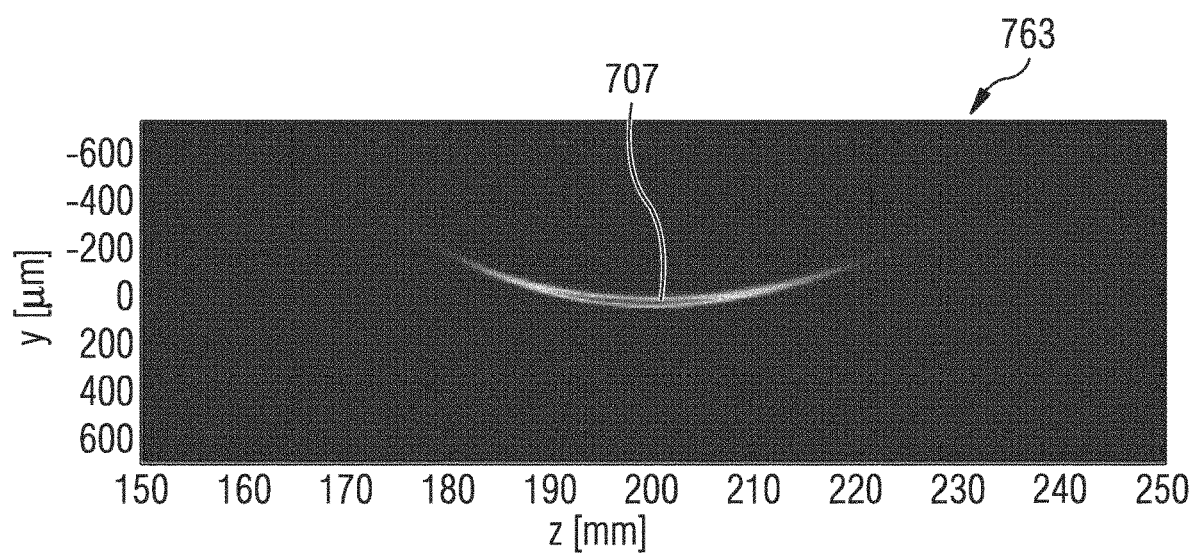
FIG. 31 is an example of a longitudinal intensity distribution in an elongated focus zone for the inverse Airy beam shape generated with the phase distribution according to FIG. 28.

The focusing of such an output intensity profile 751 results in elongated and curved focus zone 707 that is illustrated in FIG. 31. Thereby it is allowed that such an accelerated beam profile can be used also in combination with non-transparent media, if the focus zone is guided, for example, in Y direction to the border of such a material. The resulting interaction would, for example, provide a rounding of the side of the material. In other embodiments, such a beam profile can be used with transparent materials for cutting with curved cutting faces.

In some embodiments, an optical system is configured, for example, such that a real intensity enhancement in accordance with FIG. 7 as well as a virtual intensity enhancement in accordance with FIG. 3 is created. Thereby, the longitudinal extent of modification zones can be widened.

Figure 32:
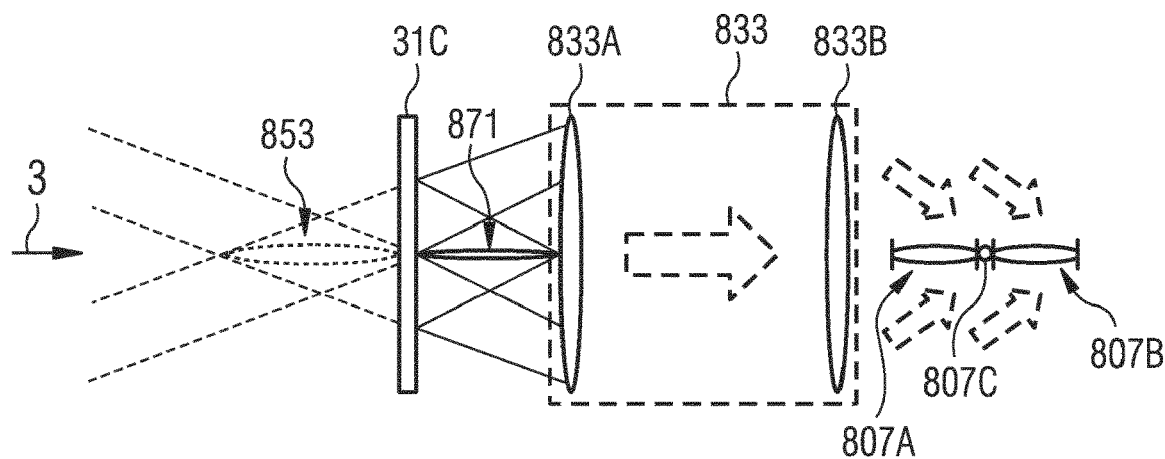
FIG. 32 is a schematic illustration for explaining the imaging of a virtual image in combination with the imaging of a real intensity enhancement.
Figure 33A:
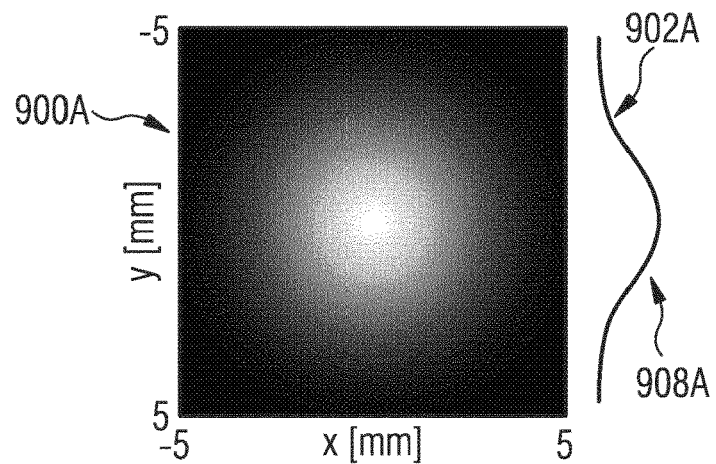
FIGS. 33A, 33B, 33C and 33 are D beam profiles for an inverse quasi-Bessel beam at the propagation from the beam shaping element to the near field optics.
Figure 33B:
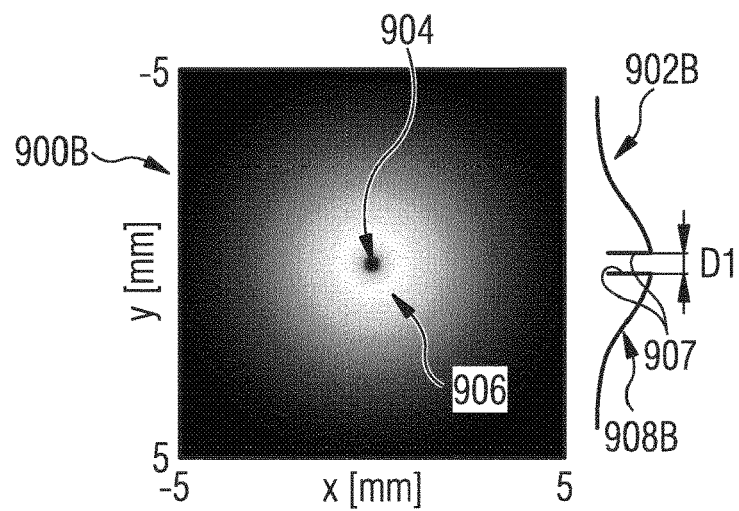
Figure 33C:
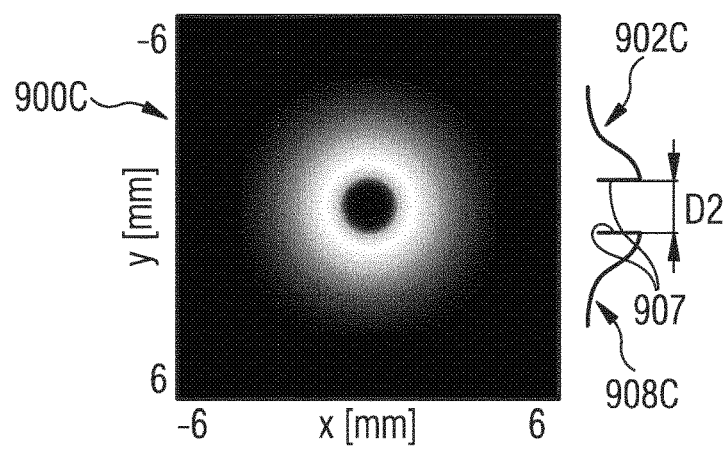
Figure 33D:
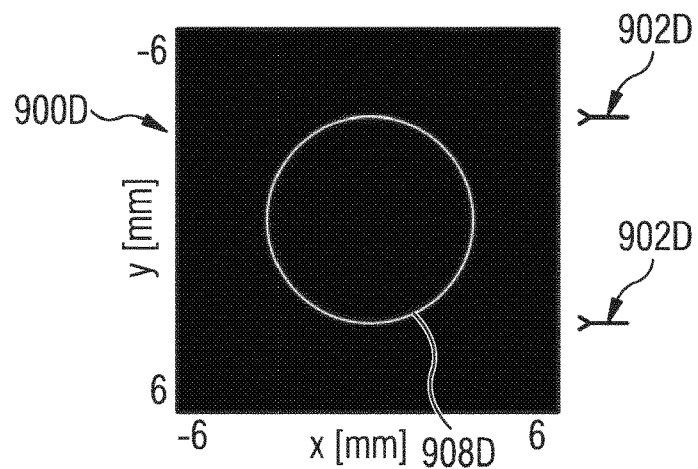

FIG. 32 shows schematically an exemplary optical system with a binary DOE 31C. If a laser beam 3 falls onto binary DOE 31C, on the one hand, a real intensity enhancement 871 is formed, for example, a quasi-Bessel beam downstream of DOE 31C. On the other hand, a beam portion is formed, which is associated with a virtual image 853—downstream of DOE 31C—of an elongated focus zone 807A, for example, in the shape of an inverse quasi-Bessel beam.

The optical system includes further a telescope system 833 with a far field optics 833A and a near field optics 833B. Telescope system 833 images virtual image 853 as well as real intensity enhancement 871 into the to be processed material 9. For that purpose, binary DOE 31C is positioned in or close to the focal plane of far field optics 833A.

The imaging results in an enlarged interaction region that includes elongated focus zone 807A and focus zone 807B that originates from the real intensity enhancement 871. In the resulting sequence of successive focus zones 807A and 807B, the intensity for (inverse) quasi-Bessel beams is at first in accordance with the intensity distribution shown in FIG. 4 and there-after in accordance with the intensity distribution shown in FIG. 8. The result is an intensity distribution with a low intensity intermediate space that is formed by the strong intensity drop 61B and the strong intensity raise 81A. That low intensity intermediate space can, for example, be provided in the region of a contact zone when processing a pair of on each other lying work-pieces. In addition, this approach allows that one can achieve twice the length for the interaction for identical input beam diameter and identical angular range, which is covered by the optical system.

In some embodiments, the non-phase-modulated portion can be focused in the area between the successive focus zones 807A and 807B. A respective Gaussian focus 807C is additionally shown schematically in FIG. 32. In such an embodiment, an adaptation of the efficiency of the diffraction may become possible, because the non-phase-modulated beam may be used for filling intensity voids.

Herein, some aspects were described exemplarily based on selected virtual beam profiles. In general, those aspects can be transferred onto the herein as (inverse) virtual beam shapes described types of beams such as inverse quasi-Bessel/Airy beam shapes, e.g., inverse quasi-Bessel beam profiles or inverse modulated or homogenized quasi-Bessel beam profiles.

In connection with FIGS. 33A to 33D and 34, the propagation from the beam shaping element to the near field optics is explained by beam profiles and amplitude courses for an inverse quasi-Bessel beam. Lighter grayscale values correspond to larger amplitudes. A respective inverted quasi-Bessel beam can be generated with the herein disclosed refractive, reflective, and diffractive optical systems, for example, with the hollow cone axicon systems and the DOE systems. A DOE system can be based, for example, on the phase distribution of a phase mask shown in FIG. 14, in which a focusing phase contribution is provided in addition to the phase required for the inverse quasi-Bessel beam.

It is assumed that a laser beam having a rotationally symmetric Gaussian beam profile is irradiated onto the beam shaping element. A Gaussian beam profile includes a transverse amplitude course that runs through the beam center in a Gaussian manner. The FIGS. 33A, 33B, 33C, and 33D show respectively the development of the beam profiles 900A, 900B, 900C, and 900D and the respective schematic amplitude courses 902A, 902B, 902C, and 902D, the latter directly after the beam shaping element at z=0 mm and at a distance downstream at z=10 mm, z=50 mm as well as in the focal plane of the successive near field component at z=200 mm. A transition of 100% is assumed, i.e., one does not generate a stray radiation portion e.g., in terms of non-phase-modulated or scattered light.

Figure 34:
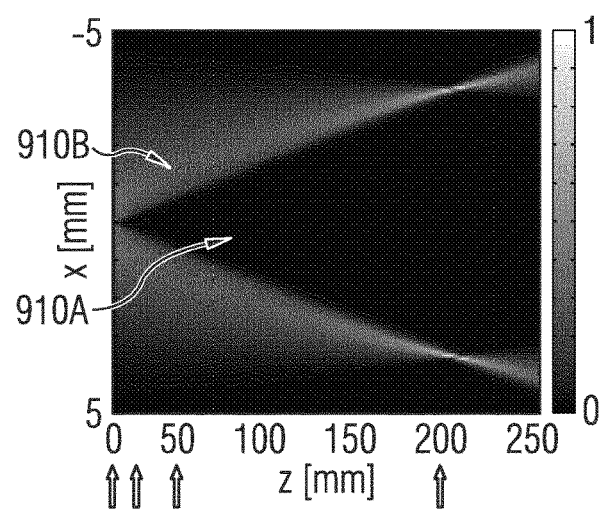
FIG. 34 is an amplitude distribution for a section along the beam axis Z for illustration of the positions of the beam profiles of FIGS. 33A to 33D.

FIG. 34 shows the amplitude distribution for a step along the beam axis Z beginning at the exit of the beam shaping element at z=0 up to the near field lens at z=250 mm. The positions of the beam profiles 900A, 900B, 900C, and 900D are indicated in FIG. 34 with arrows.

One recognizes that, due to the pure phase mask, a Gaussian beam profile 900A and a Gaussian amplitude course 902A are still present directly after the beam shaping element similar to the Gaussian beam. A sharply limited hole is then immediately formed, however, caused by the imposed phase, which yields the divergence. Already at z=10 mm, one recognizes a clear dark spot 904 in the center of the beam profile 900B. The same is continuously growing. At the same time, a ring area 906 with higher amplitude is formed.

Ring area 906 is sharply limited towards the inside which can be seen at a step shape in the radial amplitude/intensity distribution. A flank 907 of the circumferential step faces towards that beam axis/towards the beam center. With increasing z values, the opposing sections of flank 907 get separated, i.e., the central sharply limited hole grows fast in diameter (D1<D2).

In the radial amplitude/intensity distribution, ring area 906 drops towards the outside with increasing z values faster and faster. This development is schematically shown in the falling flanks 908A to 908C of the amplitude courses 902A to 902C. In the far field, i.e., for example in the overlapping focal planes of the imposed focusing (far field) action and the near field optics, a sharp ring 908D is formed within beam profile 900D, that thereafter diverges (see FIG. 34). Thereby, now a sharp edge is performed at the outer side, i.e., the step of the inner flank now faces towards the outside.

In FIG. 34, one recognizes the sharp edge in the transition between dark area 910A, which broadens in Z direction, and border area 910B, which narrows in Z direction and is more bright, whereby the grayscale values in brighter border area 910B at first have higher values radially inside and then, beginning at the focal plane, have higher values radially outside.

This general behavior of the beam profile and the amplitude courses enable a test of an optical system with a Gaussian input beam, for which at first a hole forms with a steep flank facing the inside and thereby results in a local maximum outside of the beam axis in the far field. An imaging of the beam profile from the inner area as well as in the area of the focus zone can identify the respective beam profile. The use of the optical system is thereby not necessarily limited to Gaussian beams. In addition, it is to note that the figures are a result of calculations for the ideal case. For example, if a non-ideal DOE is used, the addressed non-phase-modulated portion for higher orders or a portion of a real quasi-Bessel beam (such as for a bi-nary mask) can be on the beam axis and can fill the "hole" with intensity.

An inverse quasi-Bessel beam can therefore include a step with a steep flank in the amplitude course and accordingly in the intensity distribution. The same can in particular face to the inside in the area close to the beam shaping element, for example, in the area up to half of the far field, and in particular in the area of a focus length of the far field optics downstream of the beam shaping element. For a "simple" inverse quasi-Bessel beam without base at the beam axis, the amplitude/intensity increases in the range of the step from almost zero to the maximum of the phase-modulated beam portion. Thereby, the formation of the step (within the phase-modulated beam portion) is also given for an exemplary incident beam having essentially a constant radial intensity (radial flat top) across the beam shaping element, because the step concerns essentially the beam center.

The beam characteristic described before upstream of the far field focal plane is thereafter radially inverted up to the focus zone. After that focus zone, it inverts radially another time such that again a step shape can be formed at that position—without interaction with a material to be processed. The beam profile can, for example, be analyzed by taking the beam at a respective position, be it within the optical system after the beam shaping element or before or after the focus zone. In particular, for setups that allow a blocking of a central disturbing beam, one can analyze the intensity distribution of the phase-modulated beam portion before or after the focus area.

In this context, it is further referred to the German patent application entitled "Optical beam shaping element" filed by the same applicant at the same day that in particular discusses optical systems for beam shaping. The content of that application is herein incorporated in its completeness. As is explained therein generally, inter alia inverse quasi-Bessel beams can be used for laser material processing.

In connection with FIGS. 35A to 52C, possibilities are presented in the following for influencing the focus zone in longitudinal direction and lateral direction. In particular, the use of a DOE as an example for a phase mask being configured areally enables a simultaneous imposing of multiple phase distributions on laser beam 3. For generating an inverse quasi-Bessel/Airy beam, a virtual optical image is attributed to at least one of the phase distributions, wherein the virtual optical image can be imaged into an elongated focus area for forming a modification in the material to be processed by the laser beam. An example of such a phase distribution was provided in connection with FIG. 32. In the presence of two such phase distributions, that result in at least partially overlapping focus zones or focus zones, which at least influence each other, one can shape the geometry of the modification(s) of the material to be processed—generated by a laser pulse or a group of laser pulses.

In general, such phase distributions can form one or more ring structures (see e.g., FIG. 37C), a ring segment structure limited to an angular range (see e.g., FIG. 44), and/or one or more local maxima (see e.g., FIG. 49) in a transverse far field intensity distribution (exit intensity distribution).

Several such phase distributions can be imposed in various manners. An association of segments on the phase mask is most obvious (see e.g., FIGS. 35 A, 35B, and 42). These segments can be separate areal regions, wherein the separate regions can e.g., join radially and/or azimuthally with respect to each other and can transition into each other, for example, abrupt or weighted in the border areas. Moreover, the segments can be at least partially encapsulated into each other (see e.g., FIG. 47). Finally, the phase increase, which is created by an (areal) portion of the phase mask being configured as an area, can be a combination of phase contributions that are respectively attributed to such a phase distribution. Besides the DOE configurations described in the following, for example, also respectively combined hollow cone axicons or reflective axicons can reproduce an areal segmentation. One should understand the following examples for explaining potential concepts accordingly, wherein the concepts can also be realized with other approaches for phase imposing that were addressed before and are herein disclosed. In general, several optical elements can be combined within a DOE, by determining e.g., the transmission function of all elements (e.g., hollow cone axicon(s) and lens(es); adding the individual phase functions (exp(−1i (phi1+phi2+ . . . )). In addition or alternatively, some type of superposition of individual transmission functions can be done. For the determination of the phase distributions, it was initially referred to the publication of Leach et al.

Figure 35A:
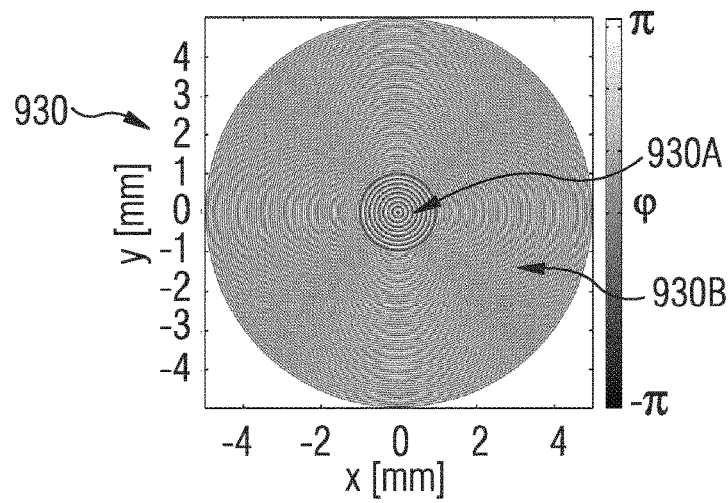
FIGS. 35A and 35B are radially segmented phase distributions.

FIG. 35A illustrates a phase distribution 930 of a phase mask with two segments having different phase distributions. One recognizes in particular a central segment 930A and a ring segment 930B. Ring-shaped rotationally symmetric phase imposing is present in central segment 930A and in ring segment 930B. The imposing of each of the phase distributions results in an inverse quasi-Bessel beam, to each of which a virtual optical image is attributed respectively upstream of the beam shaping element, wherein each of the optical images can e.g., be imaged on another longitudinal area. Accordingly, in particular longitudinal, interference effects can form.

Figure 35B:
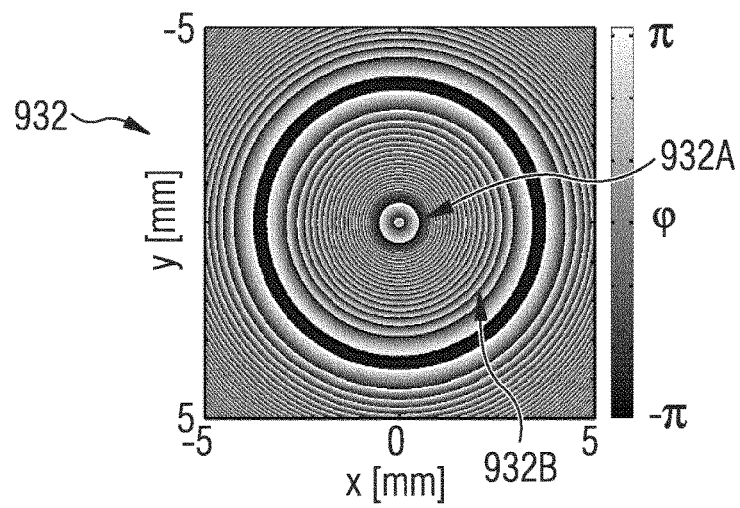

FIG. 35B shows a further example of a phase distribution 932 of a phase mask with two different phases distributions that are arranged in radial segments (central segment 932A and ring segment 932B). Herein, each of the phase distributions is additionally superposed with a spherical phase in comparison with FIG. 35A, so that the phase mask has a far field focusing action. Again, the phase distributions are rotationally symmetric. Both phase distributions from inverse quasi-Bessel beams with focus zones in comparable areas on the beam axis.

Figure 36:
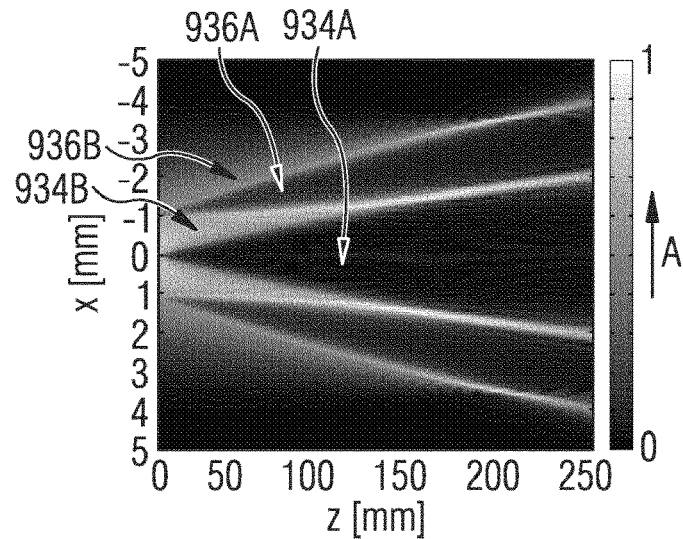
FIG. 36 is an amplitude distribution for a cut along the beam axis Z when propagating from the beam shaping element to the near field optics for a phase imposing of FIG. 35B.

For ring segment structures, FIG. 36 shows an amplitude distribution for a cut along beam axis Z beginning at the exit of the beam shaping element at z=0 mm up to the near field lens at z=250 mm. One recognizes principally two overlapping amplitude distributions with differing divergence that each correspond in their characteristics to the amplitude distribution shown in FIG. 34. In particular, one recognizes a central, dark, and in the Z direction broadening area 934A as well as an outer, dark area 936A that extends ring-shaped and widens in Z direction. Bright and ring-shaped beam areas 934B and 936B border radially to the outside to dark areas 934A and 936A. In particular, intensity distributions form that have a step-shape in the radial direction that are explained in particular in connection with FIGS. 37A to 37C and FIGS. 38A to 38C and can change their characteristics in the area of the far field focal plane. It is noted that the far field focal planes for those ring segments do not need to overlap.

Figure 37A:
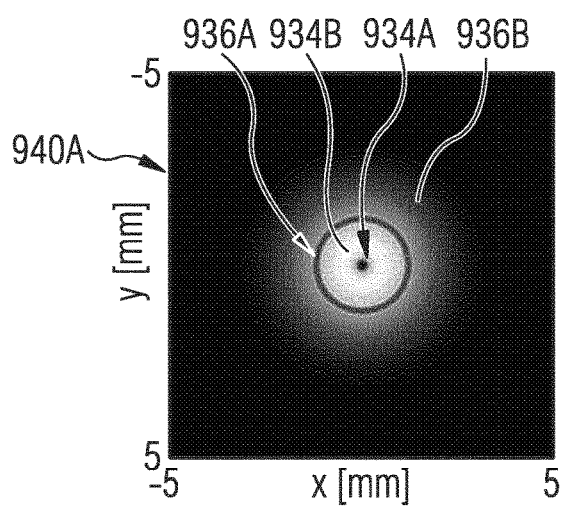
FIGS. 37A, 37B and 37C are beam profiles at z=10 mm, z=50 mm, z=200 mm for a phase imposing of FIG. 35B.

FIG. 37A shows a beam profile 940A that forms at z=10 mm. One recognizes that a central dark point, which corresponds to central dark area 934A, and a dark ring, which corresponds to ring-shaped dark area 936A, have formed in the originally Gaussian beam profile of the incident laser beam.

Figure 38A:
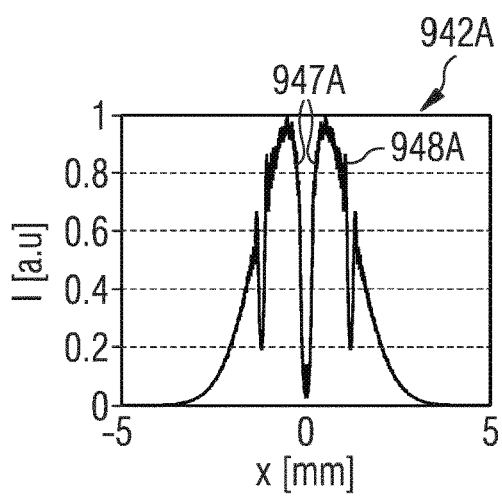
FIGS. 38A, 38B and 38C are transverse intensity distributions at z=10 mm, z=50 mm, z=200 mm for a phase imposing of FIG. 35B.

FIG. 38A shows the transverse intensity distribution associated to FIG. 37A. One recognizes in particular a pair of opposing central steep flanks 947A. These represent the transition in space from bright area 934B to central dark area 934A and face accordingly radially towards the inside. Bright area 934B includes a slowly descending flank 948A in the radially outside located area. Descending flank 948A continues in a similarly slowly descending flank 948B of bright ring-shaped beam area 936B on the other side of dark ring area 936 A.

Figure 37B:
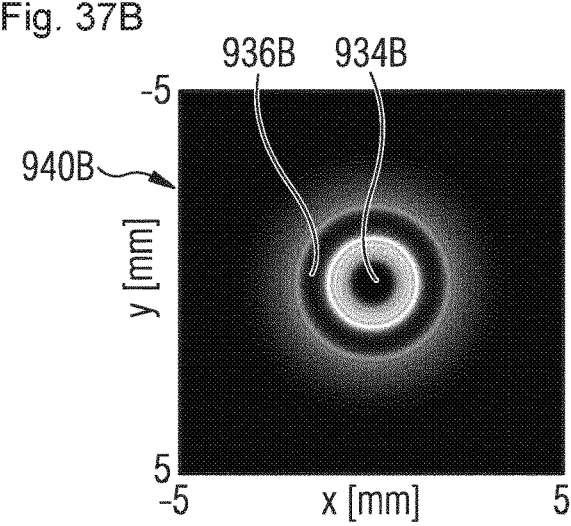
Figure 38B:
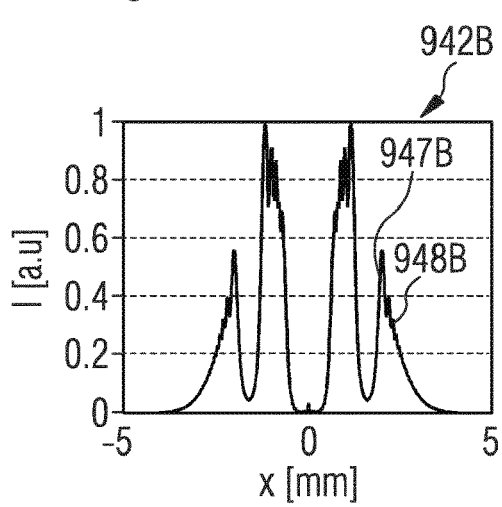

FIGS. 37B and 38B show a beam profile 940B and a radial intensity distribution 942B at z=50 mm. One recognizes that the intensity areas condensed further in the radial direction, so that central dark area 934A and dark ring area 936A became radially larger. In FIG. 38B, one recognizes in particular a steep flank 947B of outer bright area 936 that faces towards the inside as well as above noted slowly descending flank 948 that adjoins radially to the outside.

Figure 37C:
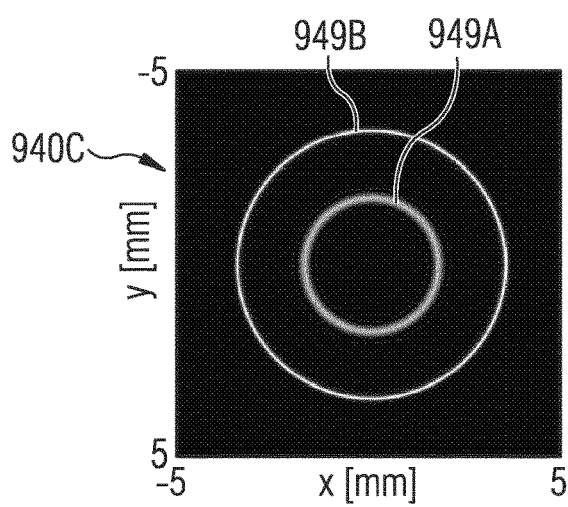
Figure 38C:
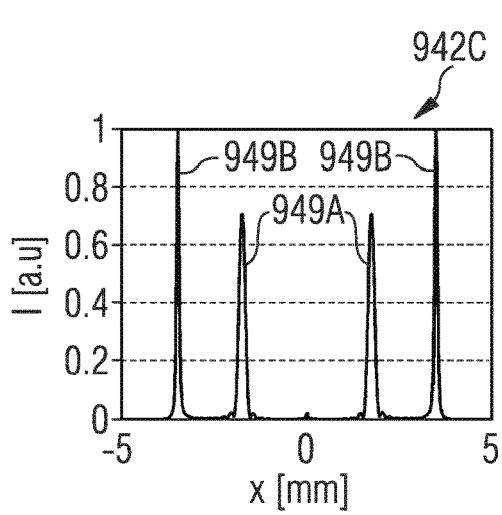

FIGS. 37C and 38C show a beam profile 940C and a radial intensity distribution 942C in the longitudinal area of the focal planes at about z=200 mm, which is associated to segments 932A and 932B. One recognizes now a pronounced ring structure with an inner ring 949A and an outer ring 949B. Each of the rings 949A and 949B creates an inverse quasi-Bessel beam profile in the focus zone, wherein again interference manifestations can form. In particular, this plane corresponds to an angle spectrum of the beam in the focus zone. The angle spectrum shows two peaks, so that exactly two angle portions are contained in the beam, one angle portion from the inner and one angle portion from the outer area of the phase mask. The two angle portions result in two-beam interference in the focus zone.

Figure 39:
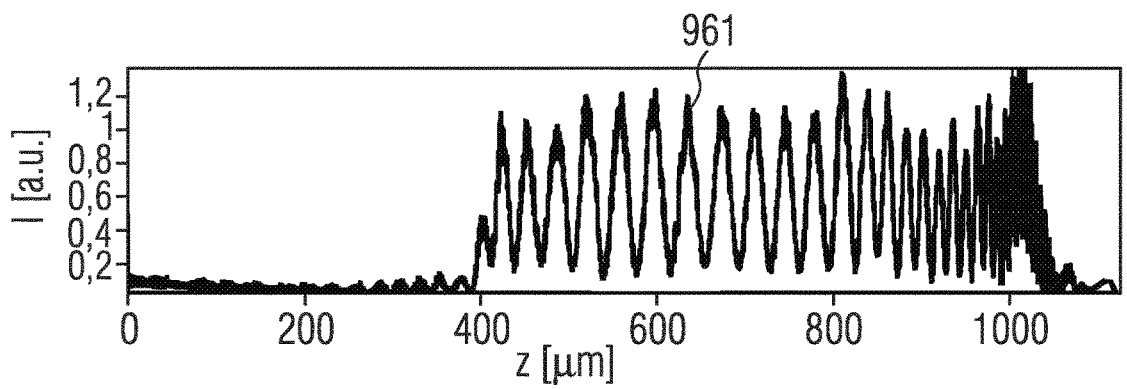
FIG. 39 is a longitudinal intensity distribution in an elongated focus zone for a phase imposing of FIG. 35B.
Figure 40:
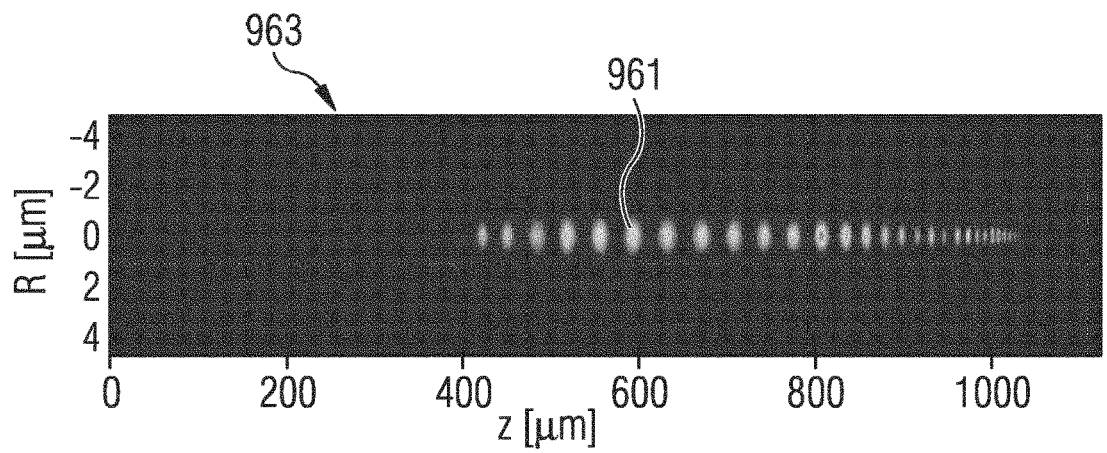
FIG. 40 is a ZR-cut of the longitudinal intensity distribution shown in FIG. 39.
Figure 41:
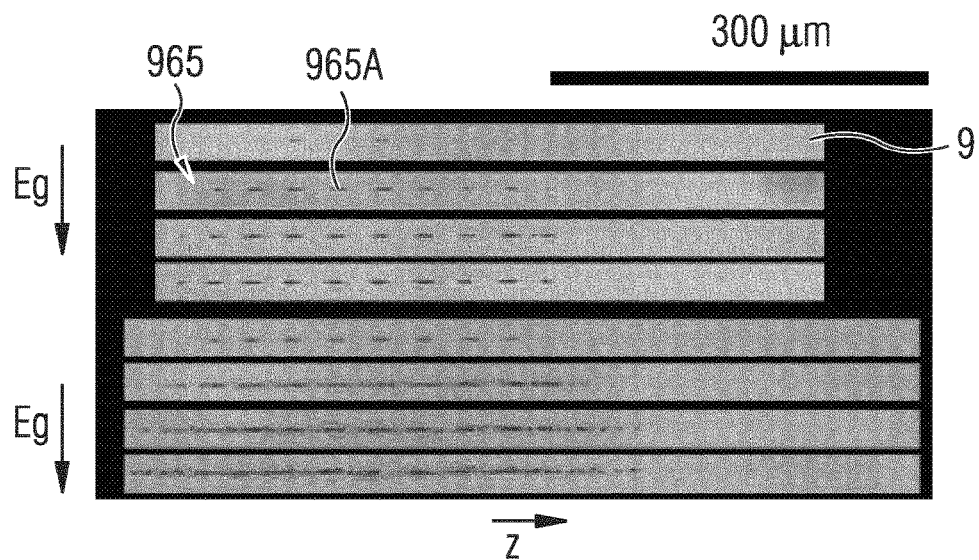
FIG. 41 is an exemplary experimental study on the modification of a transparent material in an elongated focus zone according to FIGS. 39 and 40.

FIGS. 39 to 41 show an example for an interference for a phase imposing with radially arranged segments, wherein the interference is based on the superposing of two focus zones with a small phase difference in Z direction. In the underlying phase imposing, each segment is additionally accorded a homogenization, similar to the embodiment of the longitudinal quasi-homogenized flat top intensity distribution 561, explained in connection with FIGS. 23 to 26.

In general, the introduction of multiple angle portions can cause interference, wherein this takes place under maintenance of the beam energy/fluence, so that a high efficiency at the formation of modifications can be maintained.

FIG. 39 shows a common elongated focus zone 977 for the two segment-specific images of the virtual optical images, in which the contributions of the two radial segments superpose while interfering. In propagation direction, common elongated focus zone 977 includes a sequence of intensity maxima 961, which are present over an area of about 600 μm in Z direction with almost comparable intensities. One recognizes that the density of the interference maxima 961, i.e., the frequency of the longitudinal modulation, increases in Z direction. The modulation can become e.g., uneven, if not only two angle portions interfere, but multiple angle portions are included, for example, due to the homogenizing. The latter can in particular influence the period of the modulation. For exactly two angle portions, the period of modulation would be constant.

As the segments are rotationally symmetric, also the intensity distribution is rotationally symmetric and each interference maximum 961 corresponds to a volume area, in which the intensity/fluence can be above a threshold intensity/fluence. FIG. 40 shows additionally a respective ZR-cut 963 through the intensity distribution that forms in the focus zone and includes successive interference maxima 961.

For laser material processing with such an intensity distribution, FIG. 41 shows modification zones 965 of a modification in processed material 9, which is associated with a pulse/a pulse group, wherein the modification zones extend in Z direction and include localized and displaced modification areas 965A. Modification areas 965A are attributed to interference maxima 961.

In FIG. 41, the upper four images show the formation of modification areas 965A in the range of the threshold intensity at pulse group energies, which were, for example, also applied for the experimental studies shown in FIG. 6. In comparison, one recognizes that due to the modulation by interference the peak intensity is larger than the sum of the intensity in the partial areas and accordingly larger than for a simple inverse quasi-Bessel beam with comparable angle. For that reason, in comparison to FIG. 6, the modification threshold in FIG. 41 has passed already at smaller pulse energy (the latest at the second Eg-value) significantly earlier, although it is not stronger focused.

The lower four images in FIG. 41 show the formation of modifications, as they are created when irradiating pulse groups with higher and further increasing pulse group energies. One recognizes an extension and connecting of modification areas 965A, because the modulation depth of the intensity in the longitudinal direction extends at higher intensities only in very short areas below the threshold and, therefore, only longitudinal short areas do not result in modification of material 9. One recognizes also in FIG. 41 that the end of modification zones 965 (the position of the last modification area) is essentially stationary in Z direction for increasing pulse group energy. A similar behavior is expected for variations in the beam diameter of the incident laser beam with respect to the position of the last modification area, because this can be a typical feature of an inverse quasi-Bessel beam shape.

Figure 42:
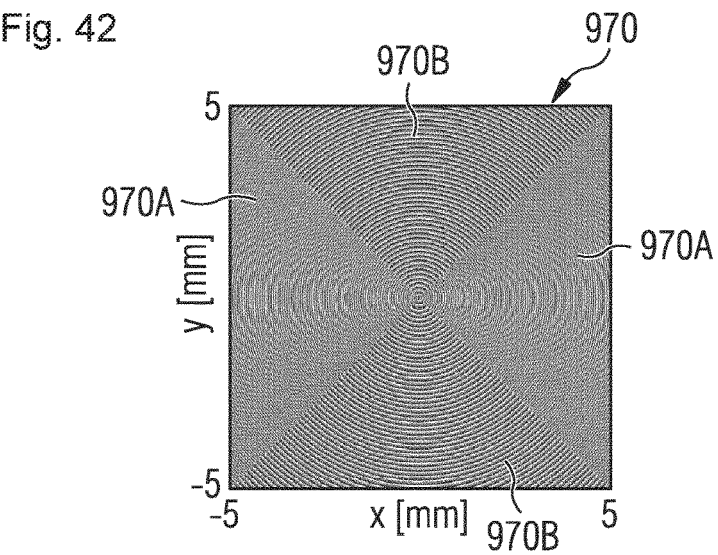
FIG. 42 is an azimuthal segmented phase distribution.

FIG. 42 shows a face distribution 970 of a phase mask with azimuthal segmentation. A pair of "X" segments 970A are opposed to each other—each in triangular shape with a rectangular triangular peak positioned respectively in the center (corresponding to the beam axis). The areas of the phase mask positioned between "X" segments 970A form two opposing "Y" segments 970B—also in triangular shape with a rectangular triangular peak positioned in the center. In general, an incident Gaussian beam is directed onto the beam shaping element such that the center of the beam shaping element coincides with the beam axis of the incident beam.

In the example of FIG. 42, the transition of the phase distributions between the individual segments takes place abrupt. The phase distribution of FIG. 42 is obviously not rotationally symmetric, because beam portions along the X direction are subject to the phase distribution of the "X" segments 970A and beam portions along the Y direction are essentially subject to the phase distribution of the "Y" segments 970B.

Figure 43:
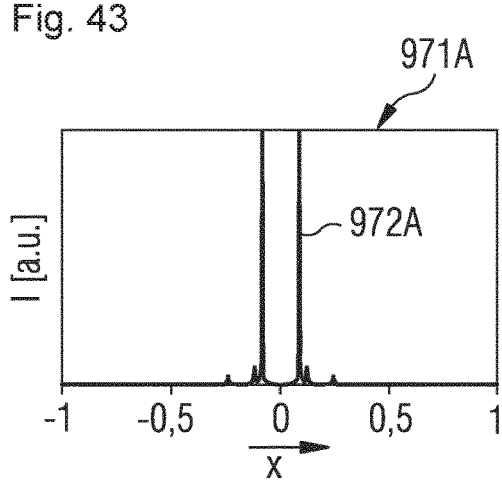
FIG. 43 is an exemplary intensity cross-section for a phase imposing of FIG. 42.
Figure 44:
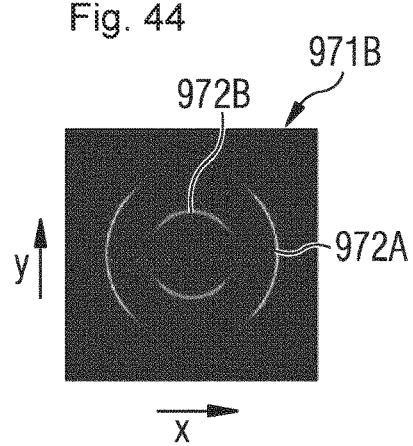
FIG. 44 is an XY-view of the output intensity profile of the intensity cross-section shown in FIG. 43.

FIGS. 43 and 44 show an intensity distribution 971A in X direction and a central portion 971B of an XY-view on an intensity profile as they can form in the far field focal plane. As the phase mask of FIG. 42 does not include a focusing phase portion, the same is used with a separate and therefore for both segments identical far field optics. In intensity distribution 971A and in portion 971B, one recognizes a two-part outer ring segment 972A of an intensity enhancement being located radially outside. In portion 971B, one further recognizes a two-part inner ring segment 972B of an intensity enhancement being located radially inside. The latter includes essentially no contribution in X direction (y=0). Accordingly, it is also not viewable as an intensity enhancement in intensity distribution 971A. Each part of ring segments 972 A and 972B extends over 90°—according to the azimuthal segmentation.

In consequence, the azimuthal segmented phase mask of FIG. 42 results in an asymmetric intensity distribution in the far field. Moreover, a longitudinal interference structure can form due to differing angle portions. The asymmetry in the beam shape originates from that asymmetry in the segments. For identical angle portions in the segments and a phase shift of the segments of PI, e.g., an asymmetric beam shape without modulation can form, for which the distance of the inverse quasi-Bessel beams created thereby can be in the range of the beams themselves. The interference of the respective inverse quasi-Bessel beam shapes can accordingly result in an asymmetry/modulation in the transverse formation of the intensity distribution.

Figure 45:
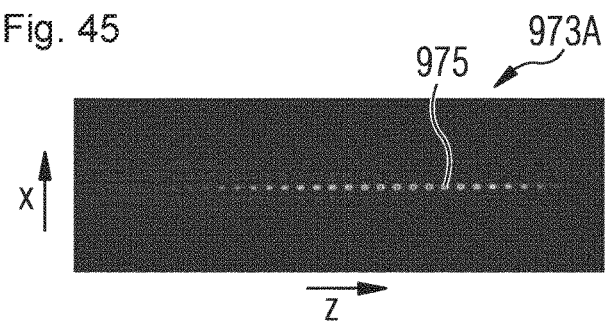
FIG. 45 is a ZX-cut of an elongated focus zone for a phase imposing of FIG. 42.
Figure 46:
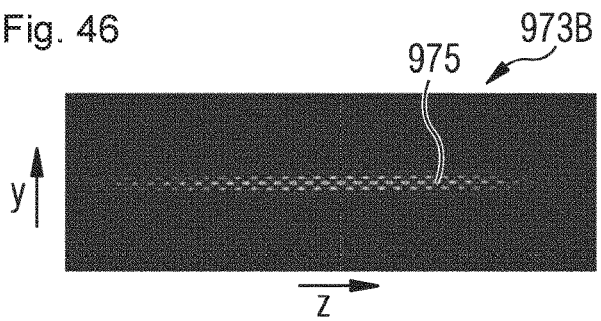
FIG. 46 is a ZY-cut of an elongated focus zone for a phase imposing of FIG. 42.

Exemplarily, FIG. 45 shows a cut 973A in ZX plane through a common elongated focus zone 973 of an intensity distribution, which originates from an output intensity distribution according to FIG. 44. FIG. 46 shows a respective cut in ZY plane 973B of the intensity distribution. One recognizes sequences of essentially linearly arranged intensity maxima 975. Intensity maxima reach significant intensities in a single row in FIG. 45 and in three rows in FIG. 46. In FIG. 46, the maxima of the outer rows in Z direction are thereby displaced with respect to the inner row. If one selects now the Y direction as feed direction for the material processing, then a single laser pulse (or a group of laser pulses) forms a focus zone/modification zone that is elongated in feed direction, i.e., is asymmetric. Accordingly, the width of the focus zone/modification zone is reduced in the separating direction, i.e., in the YZ plane. Accordingly, the result is an arrangement of three "cutting" rows of intensity maxima 975.

In other words, the asymmetry, which was created by the segmentation of the phase mask, in combination with inverse quasi-Bessel beam shapes can be used for the formation of a geometric direction of preference when separating. Also in this configuration, the end region of the focus zone/modification zone can be essentially independent from the irradiated energy and the beam diameter of the incident beam.

Figure 47:
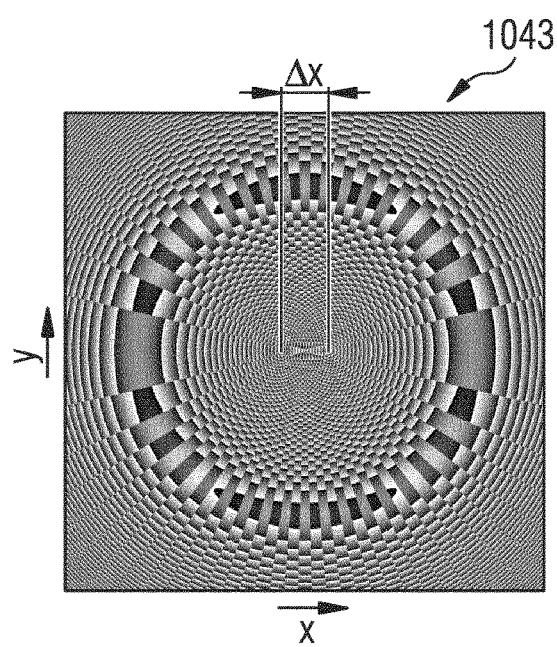
FIG. 47 is a phase distribution for generating two transverse displaced inverse quasi-Bessel beam profiles.

A further example for an interaction space in material 9 having asymmetric geometry is explained in connection with FIGS. 47 to 52C. FIG. 47 shows a phase distribution 1043 of a phase mask that is based on a superposition of two phase distributions. Each of the phase distributions belongs to an inverse quasi-Bessel beam as each can be generated, for example, with a hollow cone axicon. However, the centers of the phase distributions in X direction are displaced with respect to each other by $\Delta x$. Phase distribution 1043 includes further a superposition with a centrally arranged spherical phase, i.e., a focusing far field action is integrated in the phase mask being e.g., configured as a diffractive optical beam shaping element.

Figure 48:
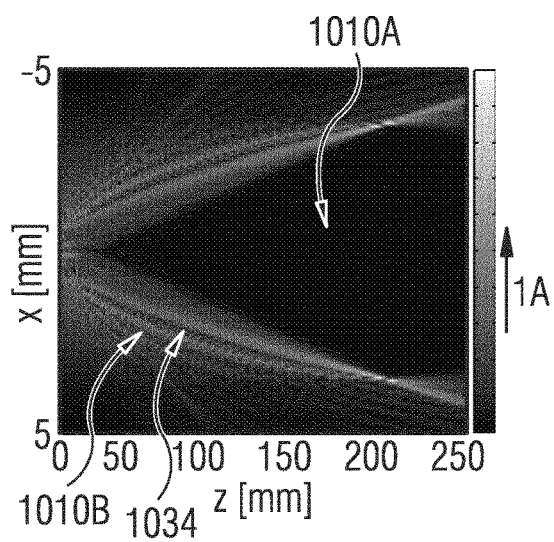
FIG. 48 is an amplitude distribution for a cut along the beam axis Z when propagating from the beam shaping element to the near field optics for a phase imposing of FIG. 47.
Figure 49:
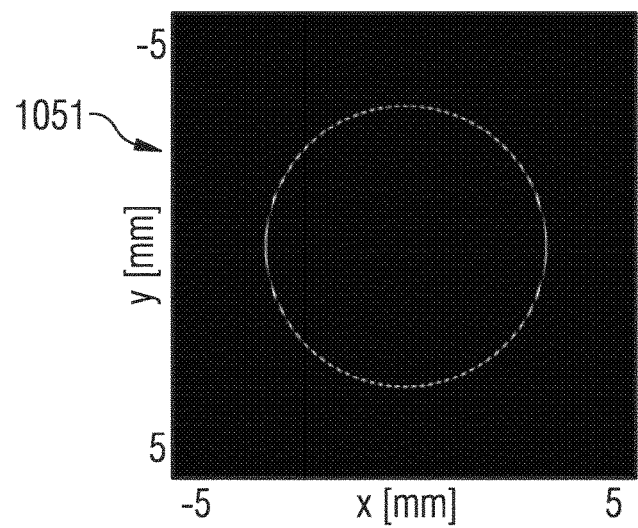
FIG. 49 is an XY-view of the output intensity profile for a phase imposing of FIG. 47.

FIG. 48 shows an amplitude distribution for a cut along beam axis Z in the range from z=0 mm to z=250 mm as it can be the result of imposing phase distribution 1048. Similar to FIG. 34, one recognizes a dark central area 1010A that widens in Z direction. Due to the only small laterally displaced phase distributions, diverse interference structures 1034 are formed in the bright intensity area 1010B that adjoins radially to outside central area 1010A.

The focusing far field action of phase distribution 1048 forms a ring in the respective focal plane, which is structured in its intensity. A respective output intensity profile 1051 is exemplary illustrated in FIG. 49. One recognizes local maxima, the extent of which is the largest in azimuthal direction in the X axis. The azimuthal extent decreases with increasing distance from the X axis and along the ring.

Figure 50:
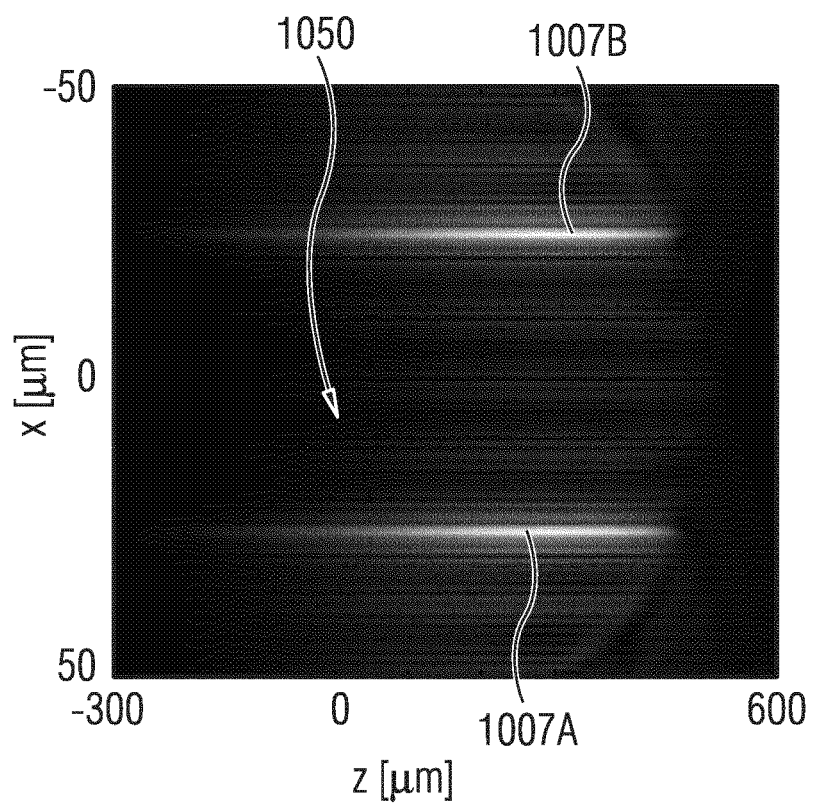
FIG. 50 is a ZX-cut of an elongated focus zone for a phase imposing of FIG. 47.

FIG. 50 shows a ZX cut through the longitudinal intensity profile within the interaction area, as it is the result of the focusing of output intensity profile 1051. In particular, two elongated focus zones 1007A and 1007B are formed that are displaced in X direction and that extend in Z direction. Besides the main maximum, respective multiple secondary maxima are formed. The pulse energy or the pulse group energy can be set such that, in particular for nonlinear absorption, only the strongest maximum or the strongest of maxima of each focus zone results in a modification of the material.

If one scans the laser beam, which was formed in that manner, in Y direction over a material to be processed, a track of two modification zones at a distance is formed. Thereby, an intended tension distribution within the material can be created, which can e.g., start a separation preferably within an intermediate area 1050 between the elongated modification zones. For example, pressure tensions can build up in the modification zones, which result in the formation of tensile stress in the intermediate area that then supports the respective separating process. Here, the X direction would be again the separating direction and the Y direction would be the feed direction.

The development of intensities in their respective optical system downstream of the diffractive optical beam shaping element will—corresponding to an inverse quasi-Bessel beam shape—again have a step structure in the radial intensity distribution. Due to the lateral displacement of the beam portions for the two inverse quasi-Bessel beams, interference structures 1034 form, however, which can overlay with the step structure.

Figure 51A:
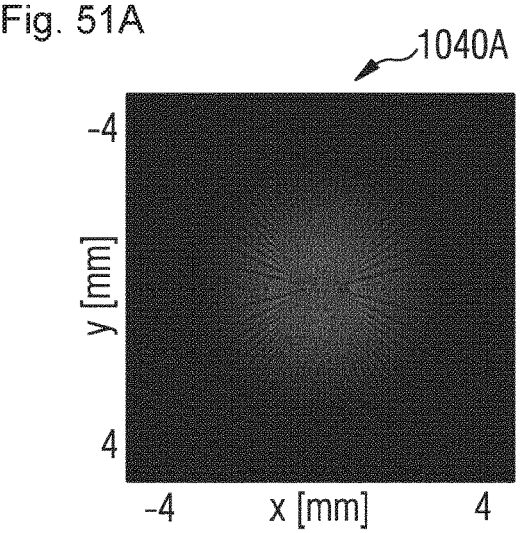
FIGS. 51A, 51B and 51C are beam profiles at z=10 mm, z=100 mm, z=150 mm for a phase imposing of FIG. 47.
Figure 51B:
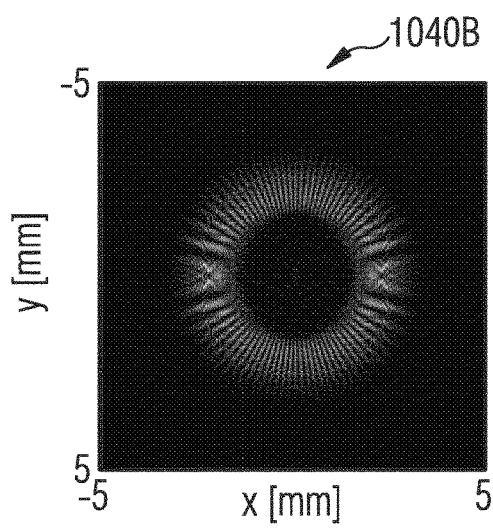
Figure 51C:
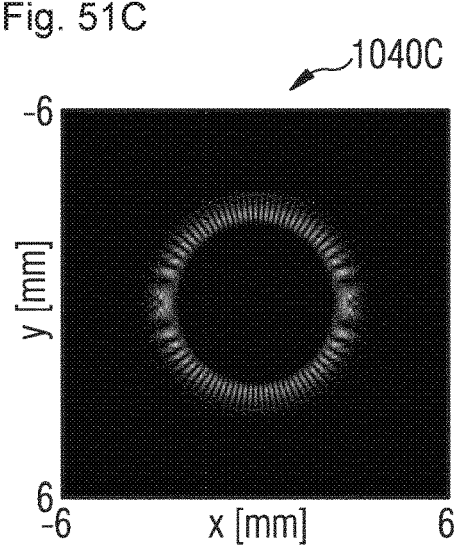
Figure 52A:
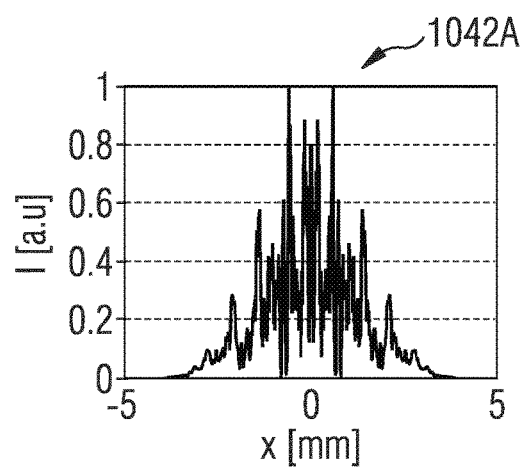
FIGS. 52A, 52B and 52C are transverse intensity distributions in X direction at z=10 mm, z=100 mm, z=150 mm for a phase imposing of FIG. 47.
Figure 52B:
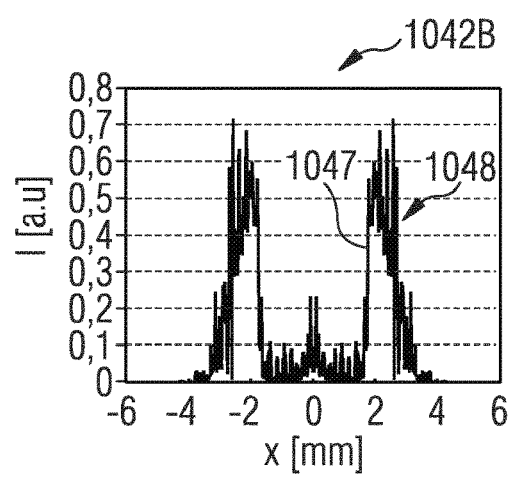
Figure 52C:
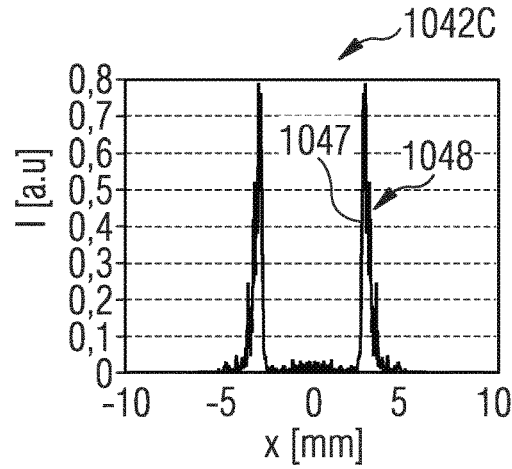

Despite the interference structures 1034, one can recognize in beam profiles 1040A to 1040C for z=10 mm, z=100 mm, and z=150 mm, which are reproduced in FIGS. 51A to 51C, areas that have higher intensities at the radial inner side. FIGS. 52A to 52C show respective intensity distributions 1042A to 1042C that extend radially in X direction. In particular, in FIGS. 52B and 52C, one that recognizes the formation of a steep flank 1047 that surrounds an inner area of lower intensity. Herein, the intensity radially decays to the outside with a slowly decreasing flank 1047. However, the formation of the flanks is strongly dependent on the direction due to the interference, as it is shown, for example, in FIGS. 51A to 51C.

The above explained examples are based on values of two phase distributions provided on the phase mask. However, more than two phase distributions can be provided. For example, more than two phase distributions can be provided in radial and azimuthal segments, or can be included in combinations of phase steps.

Further embodiments and/or further developments and aspects are summarized in the following:

In general, the herein disclosed focusing elements such as the far field optics and the near field optics can be configured as, for example, lens, mirror, DOE, or a combination thereof.

Moreover, additional optical elements can be inserted into optical systems such as the herein disclosed embodiments. Inter alia intermediate images can be inserted in the imaging system, to be able to realize, for example, a filter function as well as a scan movement in the area of the image-side focal plane. Thereby, e.g., the image-side focal plane (e.g., image plane 340 in FIG. 20) can itself be imaged by an additional optical system. Alternatively or additionally, such optical intermediate systems can allow, for example, realizing an enlarged working distance and/or a magnification of the working field for scanner application.

It is explicitly stated that all features disclosed in the description and/or the claims are intended to be disclosed separately and independently from each other for the purpose of original disclosure as well as for the purpose of restricting the claimed invention independently of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

A number of embodiments of the invention have been described. Nevertheless, it will be understood that various modifications may be made without departing from the spirit and scope of the invention. Accordingly, other embodiments are within the scope of the following claims.

What is claimed is:

1. A diffractive optical beam shaping element for imposing a phase distribution on a laser beam that is intended for laser processing of a material, which is essentially transparent for the laser beam, comprising
   a phase mask that is configured for imposing a plurality of beam shaping phase distributions on the laser beam incident on to the phase mask;
   wherein a virtual optical image is attributed to at least one of the plurality of beam shaping phase distributions, the virtual optical image being imageable into an elongated focus zone for creating a modification in the material to be processed.

2. The diffractive optical beam shaping element of claim 1, wherein the phase mask is configured such that at least one of the plurality of beam shaping phase distributions forms a ring structure, a ring segment structure limited to an azimuthal angular range, and/or a local maximum in a transverse output intensity distribution.

3. The diffractive optical beam shaping element of claim 1, wherein
   the phase mask is configured such that at least one of the plurality of beam shaping phase distributions transfers an incident laser beam having a Gaussian intensity distribution into at least one divergent beam area attributed to the virtual optical image, the divergent beam area comprising downstream of the diffractive optical beam shaping element a transverse intensity distribution, which decreases from the inside to the outside, and/or
   the phase mask is configured such that at least one of the plurality of beam shaping phase distributions transfers an incident laser beam into at least one divergent beam area attributed to the virtual optical image, the divergent beam area comprising downstream of the diffractive optical beam shaping element a transverse intensity distribution that comprises a section of a step-shaped intensity increase, which comprises a steep flank facing radially to the inside.

4. The diffractive optical beam shaping element of claim 3, wherein the transverse intensity distribution is present before a far field focal length attributed to a focusing action of the phase mask.

5. The diffractive optical beam shaping element of claim 1, wherein
   a virtual optical image is respectively attributed to several phase distributions of the plurality of beam shaping phase distributions and the virtual optical images are configured for being imaged in respective focus zones in order to shape in combination the modification in the material to be processed.

6. The diffractive optical beam shaping element of claim 1, wherein
   the focus zones are superposed with respect to each other and/or spatially complement each other.

7. The diffractive optical beam shaping element of claim 1, wherein
   the phase mask is configured such that the phase distributions of the plurality of beam shaping phase distributions image the respective virtual optical images in an asymmetric transverse intensity distribution in the material to be processed.

8. The diffractive optical beam shaping element of claim 7, wherein the asymmetric transverse intensity distribution in the material to be processed is based on an asymmetry of a focus zone itself and/or on the asymmetric arrangement of multiple focus zones with respect to each other.

9. The diffractive optical beam shaping element of claim 1, further comprising at least one of
   a separate far field optical element and
   a far field optical phase imposing integrated into the phase mask,
   wherein the far field optical element and/or the far field optical phase imposing is configured to perform a focusing action on the laser beam, in order to form the output intensity distribution for the at least the one virtual optical image in a respective focal plane.

10. The diffractive optical beam shaping element of claim 1, wherein
the phase increase generated by a section of the phase mask, which is configured areally, is a combination of phase contributions, which are respectively attributed to the plurality of beam shaping phase distributions.

11. The diffractive optical beam shaping element of claim 1, wherein
at least two images of the virtual optical images are superposed while interfering or form a common elongated focus zone.

12. An optical system for beam shaping of a laser beam for processing a transparent material by modifying the material in a focus zone that is elongated in a common propagation direction, the optical system comprising
the diffractive optical beam shaping element of claim 1; and
a near field optical element, which is arranged downstream of the diffractive optical beam shaping element at a beam shaping distance and configured to focus the laser beam into the focus zone, wherein
at least one imposed phase distribution of the plurality of beam shaping phase distributions is such that a virtual optical image of an elongated focus zone is attributed to the laser beam, the virtual optical image being located before the diffractive optical beam shaping element, and
the beam shaping distance corresponds to a propagation length of the laser beam within which the plurality of beam shaping phase distributions transform the transverse input intensity profile into a transverse output intensity profile in the region of the near field optical element.

13. The optical system of claim 12, wherein the transverse output intensity profile has, in comparison with the input intensity profile, at least one local maximum lying outside of a beam axis.

14. The optical system of claim 12, wherein
the diffractive optical beam shaping element is arranged to be rotatable around a beam axis of the incident laser beam to set an asymmetric transverse intensity distribution in the workpiece in its orientation with respect to a preferred direction.

15. The optical system of claim 12, wherein an imaging system attributes to the beam shaping element an image plane downstream of a longitudinal center of the image of the virtual optical image, and a transverse beam profile of the laser beam is present at the beam shaping element in the image plane.

16. The optical system of claim 15, wherein there is in the region of the image plane a change, which changes fast in longitudinal direction, from a lateral beam profile, which is given in the focus zone, to a lateral beam profile having a dark center.

17. The optical system of claim 12, wherein only a central area of the incident laser beam contributes to a downstream end of the focus zone attributed to the virtual optical image, so that a change of the beam diameter of the incident laser beam does not result in an essentially longitudinal displacement of the downstream end of the focus zone.

18. A laser processing machine for processing a material, which is to a large extent transparent for the laser beam, with a laser beam by modifying the material in a focus zone, which is elongated in a common propagation direction of the laser beam, comprising
a laser beam source;
an optical system of claim 12; and
a control unit for setting operation parameters.

19. The laser processing machine of claim 18, wherein the control unit is configured for orienting a transverse asymmetric intensity distribution with respect to a preferred direction.

20. The laser processing machine of claim 18, wherein the control unit is configured for setting a rotation angle of the diffractive optical beam shaping element with respect to the beam axis of the incident laser beam.

21. A diffractive optical beam shaping element for imposing a phase distribution on a laser beam that is intended for laser processing of a material, which is essentially transparent for the laser beam, comprising
a phase mask that is configured for imposing a plurality of beam shaping phase distributions on the laser beam incident on to the phase mask;
wherein
a virtual optical image is attributed to at least one of the plurality of beam shaping phase distributions, the virtual optical image being imageable into an elongated focus zone for creating a modification in the material to be processed
the phase mask, which is configured areally, comprises a plurality of segments that are respectively configured for imposing a segment-specific phase distribution of the plurality of beam shaping phase distributions on the laser beam,
at least two segment specific phase distributions are associated respectively with a segment-specific virtual optical image that is imageable in a segment-specific focus zone, and
the respective segment-specific focus zones are arranged with respect to each other such that they contribute together to the formation of a modification zone.

22. The diffractive optical beam shaping element of claim 21, wherein
the plurality of segments comprises at least two segments that are composed of spatial structures that are at least partly encapsulated into each other.

23. The diffractive optical beam shaping element of claim 22, wherein a weighted transition between the respective neighboring phase distributions is set in the transition area of neighboring segments of the plurality of segments.

24. The diffractive optical beam shaping element of claim 21, wherein
the segment-specific focus zones are superposed with respect to each other and/or spatially complement each other.

25. The diffractive optical beam shaping element of claim 21, where
segments of the plurality of segments join radially and/or azimuthal.

26. The diffractive optical beam shaping element of claim 21, wherein
at least two segment-specific images of the virtual optical images are superposed while interfering or form a common elongated focus zone.

* * * * *